United States Patent
Mogi et al.

(10) Patent No.: US 9,981,412 B2
(45) Date of Patent: May 29, 2018

(54) METHOD OF MANUFACTURE OF SEAT PAD

(71) Applicants: TOYO TIRE & RUBBER CO., LTD., Osaka-shi, Osaka (JP); TACHI-S CO., LTD., Akishima-shi, Tokyo (JP)

(72) Inventors: Manabu Mogi, Osaka (JP); Yu Sasaki, Osaka (JP); Junpei Yoshikawa, Akishima (JP); Jun Takano, Akishima (JP); Shogo Suzuki, Akishima (JP)

(73) Assignees: TOYO TIRE & RUBBER CO., LTD., Itami-shi (JP); TACHI-S CO., LTD., Akishima-shi (JP)

( * ) Notice: Subject to any disclaimer, the term of this patent is extended or adjusted under 35 U.S.C. 154(b) by 67 days.

(21) Appl. No.: 14/562,868

(22) Filed: Dec. 8, 2014

(65) Prior Publication Data
US 2015/0158213 A1 Jun. 11, 2015

(30) Foreign Application Priority Data
Dec. 11, 2013 (JP) .................................. 2013-255702

(51) Int. Cl.
*B29C 44/12* (2006.01)
*B29C 39/12* (2006.01)
(Continued)

(52) U.S. Cl.
CPC .......... *B29C 44/1276* (2013.01); *B29C 33/12* (2013.01); *B29C 39/10* (2013.01);
(Continued)

(58) Field of Classification Search
CPC ..................... B29C 44/1261; B29C 44/1276
See application file for complete search history.

(56) References Cited

U.S. PATENT DOCUMENTS 3,691,569 A * 9/1972 Ikada ..................... A47C 23/00
  277/936
5,630,240 A * 5/1997 Matsuoka ................ A47C 7/18
  297/452.25
(Continued)

FOREIGN PATENT DOCUMENTS

CN 102413738 A 4/2012
JP S46-26432 Y 9/1971
(Continued)

OTHER PUBLICATIONS

Ion-Final Office Action dated Oct. 25, 2016, issued in U.S. Appl. No. 14/562,874 (16 pages).
(Continued)

*Primary Examiner* — Matthew Daniels
*Assistant Examiner* — Patrick Butler
(74) *Attorney, Agent, or Firm* — Westerman, Hattori, Daniels & Adrian, LLP

(57) ABSTRACT

A tubular lower mold partitioning wall is erected on a lower mold, and a three-dimensional mesh-like body is disposed with a part of a side face exposed with respect to the lower mold partitioning wall. When a pad main body is molded by foaming a liquid raw material, the mesh-like body is penetrated through the pad main body in a thickness direction. Since the mesh-like body is disposed with a part of the side face exposed with respect to the lower mold partitioning wall, the liquid raw material is hardened between the fibers on the side face of the mesh-like body, and the side face is attached to the pad main body. Therefore, it is possible that the mesh-like body is not easily displaced with respect to the pad main body while suppressing a sweaty feeling.

6 Claims, 13 Drawing Sheets

(51) Int. Cl.
  *B29C 33/12* (2006.01)
  *B29C 39/10* (2006.01)
  *B60N 2/56* (2006.01)
  *B29L 9/00* (2006.01)
  *B29L 31/58* (2006.01)
  *B29K 75/00* (2006.01)
  *B29K 105/04* (2006.01)
  *B29K 105/08* (2006.01)
  *A47C 27/22* (2006.01)
  *A47C 7/18* (2006.01)
  *A47C 7/02* (2006.01)
  *A47C 27/14* (2006.01)
  *B29K 105/00* (2006.01)
  *B29L 31/00* (2006.01)

(52) U.S. Cl.
  CPC ........ *B29C 39/123* (2013.01); *B29C 44/1261* (2013.01); *B60N 2/5664* (2013.01); *A47C 7/02* (2013.01); *A47C 7/18* (2013.01); *A47C 27/142* (2013.01); *A47C 27/22* (2013.01); *B29K 2075/00* (2013.01); *B29K 2105/0058* (2013.01); *B29K 2105/04* (2013.01); *B29K 2105/0809* (2013.01); *B29K 2105/0854* (2013.01); *B29K 2713/00* (2013.01); *B29L 2009/00* (2013.01); *B29L 2031/58* (2013.01); *B29L 2031/771* (2013.01)

(56) References Cited

U.S. PATENT DOCUMENTS

| 8,864,238 B2 | 10/2014 | Oota et al. | |
|---|---|---|---|
| 2013/0214583 A1* | 8/2013 | Uramichi | B60N 2/70 297/452.48 |

FOREIGN PATENT DOCUMENTS

| JP | 61-233513 A | | 10/1986 |
|---|---|---|---|
| JP | H01-110914 A | | 4/1989 |
| JP | H01-104247 | | 7/1989 |
| JP | H1-104247 U | * | 7/1989 |
| JP | 2007-307232 A | | 11/2007 |
| JP | 2008-22982 A | | 2/2008 |
| JP | 2012-115515 A | | 6/2012 |
| JP | 2014-79318 A | | 5/2014 |

OTHER PUBLICATIONS

Office Action dated Aug. 2, 2016, issued in counterpart Chinese application No. 201410710298.5, with English translation. (10 pages).

Decision of Refusal dated Aug. 1, 2017, issued in counterpart Japanese Application No. 2013-255693, with English translation. (7 pages).

Office Action dated May 23, 2017, issued in counterpart Japanese Application No. 2013-255702, with English translation. (10 pages).

Office Action dated Mar. 20, 2017, issued in counterpart Chinese Application No. 201410710298.5, with English translation. (17 pages).

Office Action dated May 23, 2017, issued in Japanese Application No. 2013-255693, with English translation. (9 pages). (cited in related U.S. Appl. No. 14/562,874).

Office Action dated Mar. 10, 2017, issued in Chinese Application No. 201410710722.6, with English translation. (17 pages). (cited in related U.S. Appl. No. 14/562,874).

Office Action dated Oct. 13, 2017, issued in counterpart Chinese Application No. 201410710298.5, with English translation. (11 pages).

* cited by examiner

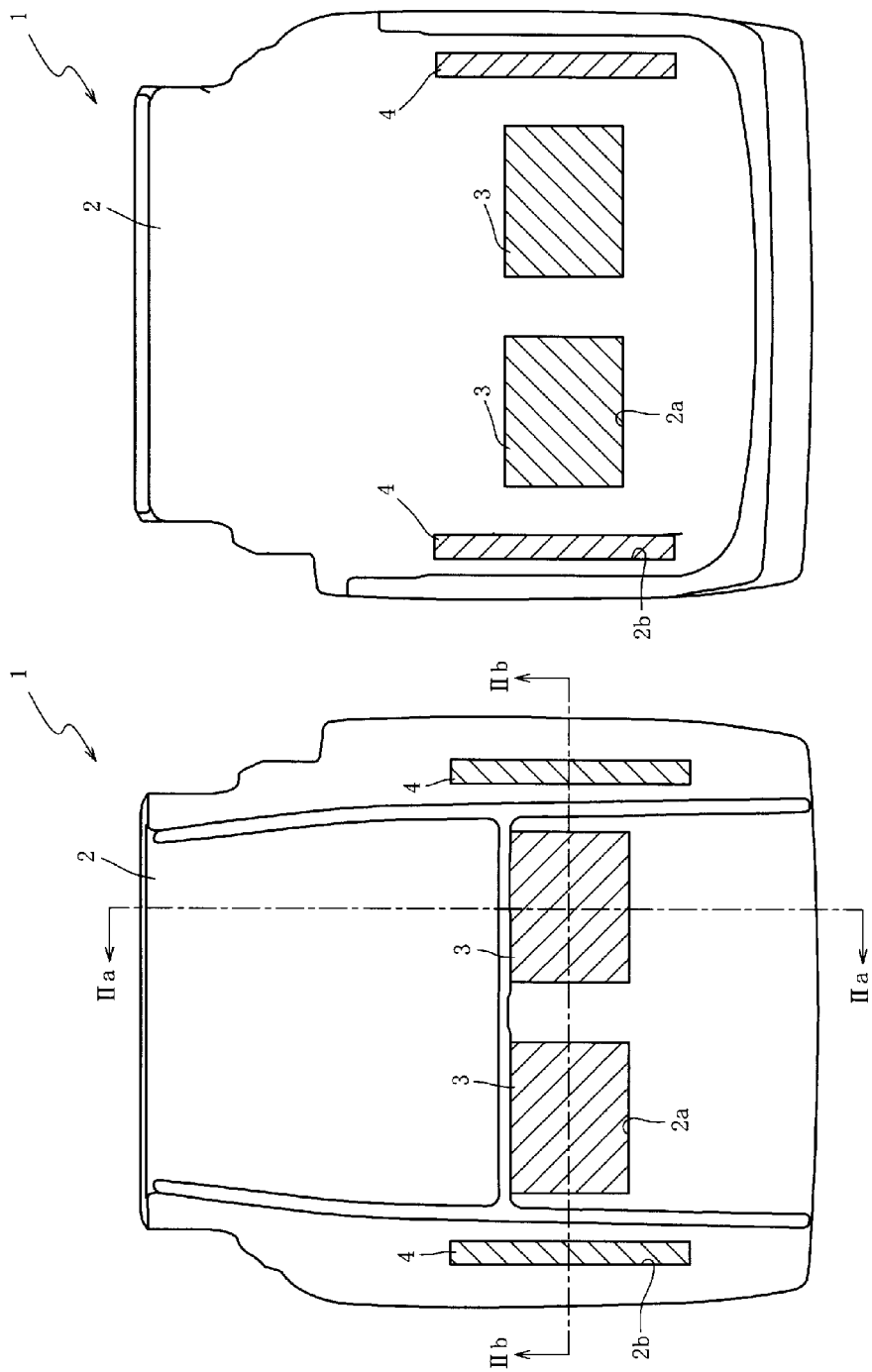

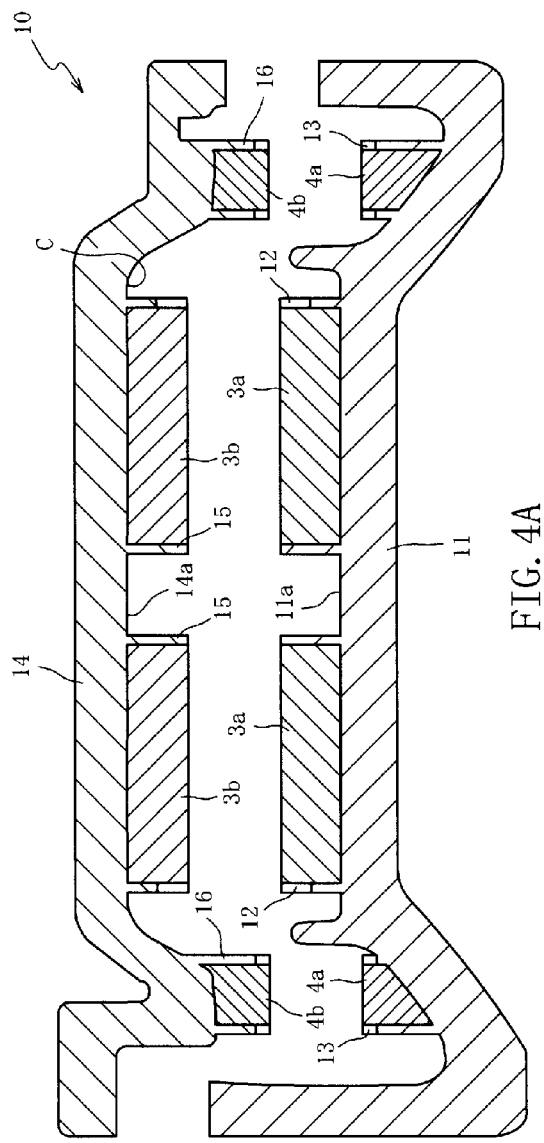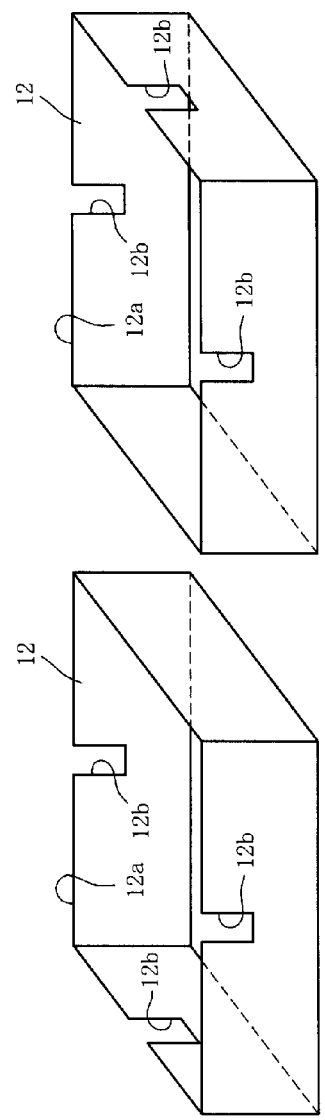
FIG. 4A
FIG. 4B

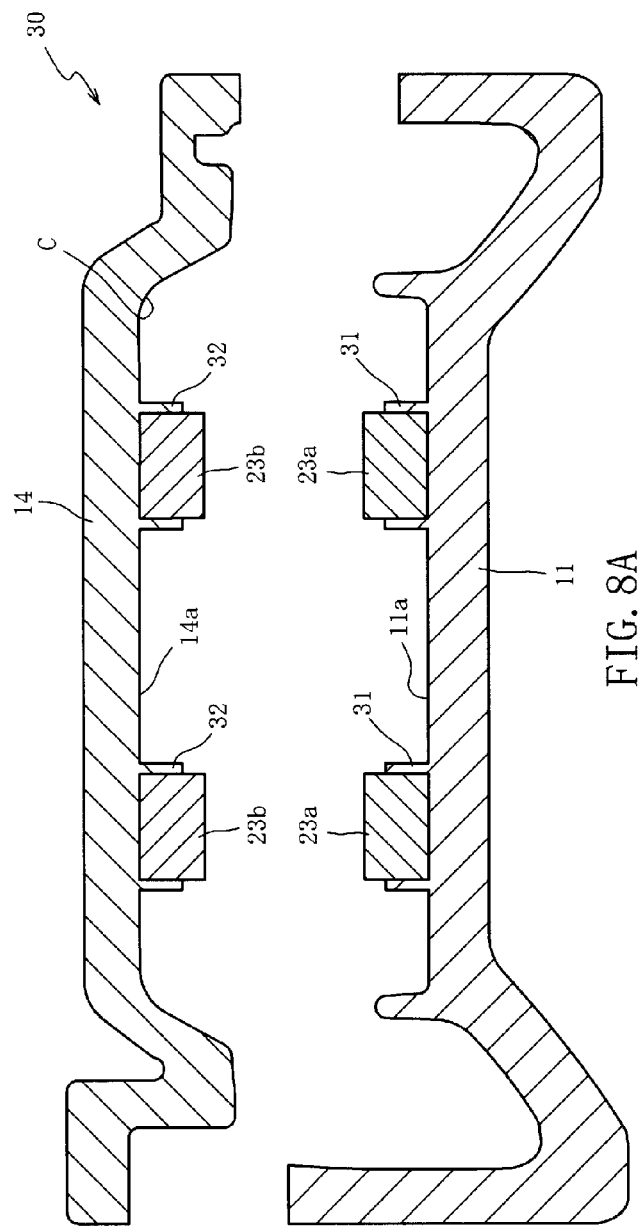
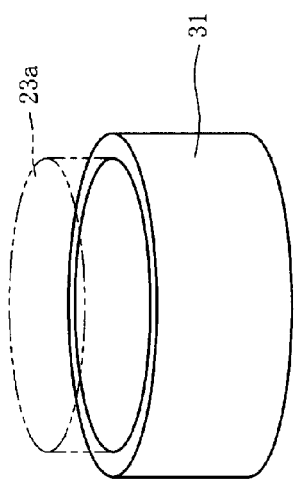
FIG. 8A
FIG. 8B

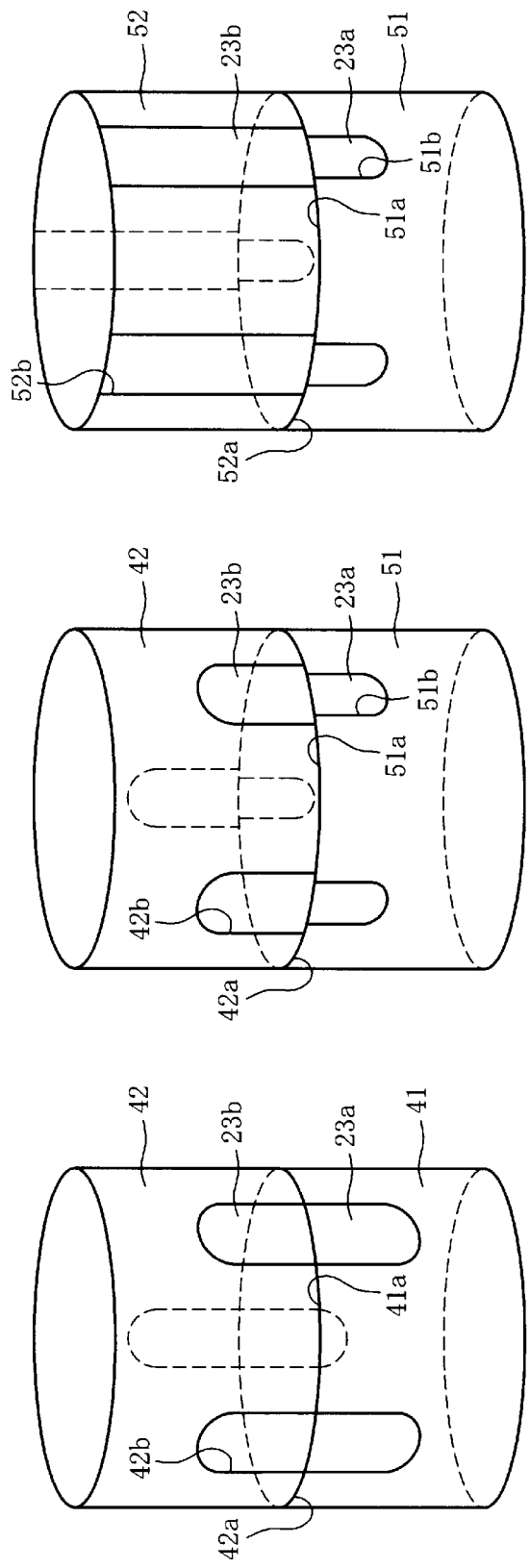

METHOD OF MANUFACTURE OF SEAT PAD

TECHNICAL FIELD

The present invention relates to a method of manufacture of a seat pad.

BACKGROUND ART

Since a seat pad used for seats and chairs provided on vehicles such as cars, ships, and aircrafts is demanded to have a cushioning property as well as a vibration absorbing property, synthetic resin flexible foam such as flexible urethane foam is used. However, since the flexible foam has a low air permeability, sweat coming from a person who takes a seat is prone to cause a sweaty feeling. Therefore, there is a seat pad in which a hole is formed, which is penetrated through a pad main body made of flexible foam in the thickness direction, and a three-dimensional mesh-like body is fit into the hole (Patent Literature 1). In the technique disclosed in Patent Literature 1, the three-dimensional mesh-like body is formed of a plurality of three-dimensionally entangled fibers, so that the air permeability of the seat pad in the thickness direction is secured using the three-dimensional mesh-like body, and a sweaty feeling experienced by a person who takes a seat can be suppressed.

CITATION LIST

Patent Literature

[Patent Literature 1] Japanese Unexamined Patent Application Publication No. 2012-115515 (more specifically FIG. 3)

SUMMARY OF INVENTION

Technical Problem

However, in the technique described above, since the three-dimensional mesh-like body is simply fit into the hole formed and penetrated through the pad main body, a problem arises in that the three-dimensional mesh-like body is easily displaced with respect to the pad main body (the hole), that the three-dimensional mesh-like body drops off from the hole in the process of assembling work of the seat pad, or that the three-dimensional mesh-like body is sunk into the pad main body in use and comfortableness to sit is degraded.

The present invention is made in order to solve the problem described above, and it is an object to provide a method of manufacture of a seat pad for obtaining a seat pad in which a three-dimensional mesh-like body is not easily displaced while suppressing a sweaty feeling.

Solution to Problem and Advantageous Effects of Invention

In order to achieve the object, in accordance with a method of manufacture of a seat pad according to a first aspect of the invention, a tubular lower mold partitioning wall having an opened top end is erected on a molding face of a lower mold onto which a liquid raw material of flexible foam made of a synthetic resin is poured. A three-dimensional mesh-like body formed of a plurality of three-dimensionally entangled fibers is disposed as a part of the side face of the three-dimensional mesh-like body is exposed with respect to the lower mold partitioning wall in the step of disposing the mesh-like body. In the step of forming a cavity, an upper mold is laid over the lower mold, in which the three-dimensional mesh-like body is disposed, to form a cavity, and the three-dimensional mesh-like body is fixed in the cavity. In the step of molding, the liquid raw material is foamed in the cavity to mold a pad main body formed of the flexible foam, and the three-dimensional mesh-like body is penetrated through the pad main body in the thickness direction.

Since the three-dimensional mesh-like body is disposed as a part of the side face of the three-dimensional mesh-like body is exposed with respect to the lower mold partitioning wall, the liquid raw material of flexible foam contacts a part of the exposed side face of the three-dimensional mesh-like body. As a result, the liquid raw material is hardened between the fibers on the side face of the three-dimensional mesh-like body, so that the side face of the three-dimensional mesh-like body can be attached to the pad main body. The side face of the three-dimensional mesh-like body is attached to the pad main body, so that an effect is exerted that it is possible that the three-dimensional mesh-like body is not easily displaced with respect to the pad main body.

In accordance with a method of manufacture of a seat pad according to a second aspect of the invention, in the step of disposing the lower mold in the step of disposing the mesh-like body, one of split mesh-like bodies that the three-dimensional mesh-like body is split into two parts in a thickness is inserted into an inside of the lower mold partitioning wall. Moreover, the step of disposing the upper mold in the step of disposing the mesh-like body, the other split mesh-like body is disposed on a molding face of the upper mold. In the step of forming the cavity, the one split mesh-like body inserted into the inside of the lower mold partitioning wall is touched to the other split mesh-like body disposed on the upper mold, so that the air permeability in the thickness direction can be secured using the two split mesh-like bodies. The split mesh-like bodies are ones that the three-dimensional mesh-like body is split into two parts in the thickness, and the dimensions of the individual bodies can be made smaller, so that in addition to the effect according to the first aspect of the invention, an effect is exerted that it is possible to improve the ease of handling the three-dimensional mesh-like body (the split mesh-like bodies).

In accordance with a method of manufacture of a seat pad according to a third and fourth aspects of the invention, the lower mold partitioning wall includes a notch portion notched from the top end toward the molding face along a height direction, so that the liquid raw material in the midway point of being foamed can be contacted with the side face of the three-dimensional mesh-like body or the split mesh-like body (hereinafter, referred to as "the three-dimensional mesh-like body or the like") on which the notch portion is located. The liquid raw material is contacted with the side face of the three-dimensional mesh-like body or the like and hardened, and the side face of the three-dimensional mesh-like body or the like is attached to the pad main body. Therefore, in addition to the effect according to the first and second aspects of the invention, an effect is exerted that it is possible that the area of the side face of the three-dimensional mesh-like body or the like attached to the pad main body is appropriately set by appropriately setting the size or the number of the notch portion, for example.

In accordance with a method of manufacture of a seat pad according to a fifth aspect of the invention, the notch portion is formed in a predetermined length from a top end of the lower mold partitioning wall to a portion not reaching the molding face, so that it is possible to prevent the liquid raw material from contacting the side face of the three-dimensional mesh-like body or the like located on the front surface of the pad main body.

As a result, it is possible to prevent such an event that a hard portion, which the liquid raw material is hardened, is formed on the front surface of the pad main body. Therefore, in addition to the effect according to the fourth aspect of the invention, effects are exerted that it is possible that the touch of the front surface of the pad main body is improved and the person who takes a seat hardly experiences an uncomfortable feeling.

In accordance with a method of manufacture of a seat pad according to any one of a sixth, seventh, eighth and ninth aspects of the invention, the upper mold includes a tubular upper mold partitioning wall erected on the molding face and opened toward the cavity. In the step of disposing the upper mold, the other split mesh-like body is disposed as a part of a side face of the other split mesh-like body is exposed with respect to the upper mold partitioning wall. Therefore, the area of the side face of the split mesh-like body, with which the liquid raw material of flexible foam contacts, can be limited using the upper mold partitioning wall. Accordingly, in addition to the effect of any one of the second, third, fourth and fifth aspects of the invention, respectively, an effect is exerted that the area of the side face of the split mesh-like body attached to the pad main body can be appropriately set.

BRIEF DESCRIPTION OF DRAWINGS

FIG. 1a is a plan view of a seat pad according to a first embodiment, and FIG. 1b is a diagram of the back surface of the seat pad.

FIG. 4a is a cross sectional diagram of the end face of a shaping mold in which a split mesh-like body is disposed on a lower mold and an upper mold, and FIG. 4b is a perspective view of a lower mold partitioning wall disposed on the lower mold.

FIG. 8a is a cross sectional diagram of the end face of a shaping mold in which a split mesh-like body is disposed on a lower mold and an upper mold, and FIG. 8b is a perspective view of a lower mold partitioning wall disposed on the lower mold.

FIG. 10a is a perspective view of a lower mold partitioning wall and an upper mold partitioning wall of a shaping mold that forms a seat pad according to the third embodiment, FIG. 10b is a perspective view of a lower mold partitioning wall and an upper mold partitioning wall of a shaping mold that forms a seat pad according to a fourth embodiment, and FIG. 10c is a perspective view of a lower mold partitioning wall and an upper mold partitioning wall of a shaping mold that forms a seat pad according to a fifth embodiment.

DESCRIPTION OF EMBODIMENTS

Figure 2A:
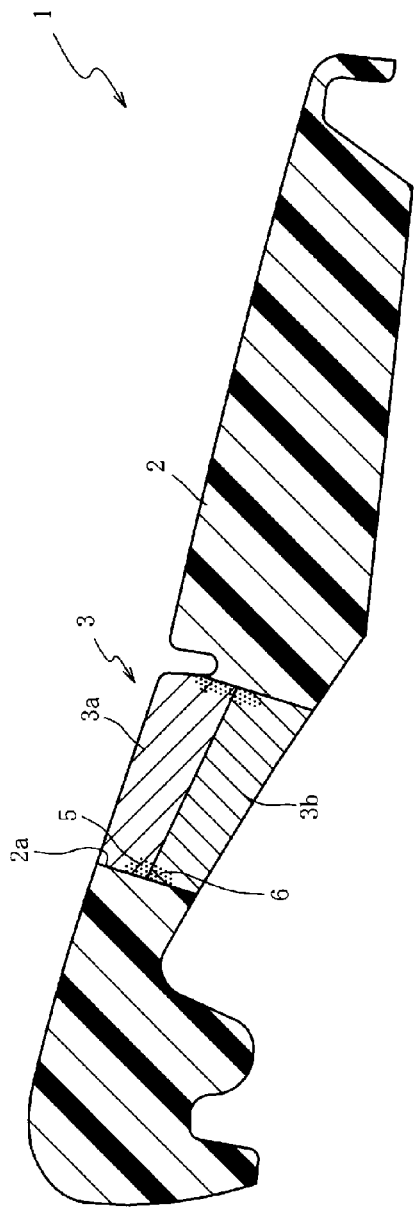
FIG. 2a is a cross sectional diagram of the end face of the seat pad taken along line IIa-IIa in FIG. 1.

Hereinafter, preferred embodiments of the present invention will be described with reference to the drawings. First, a seat pad 1 according to a first embodiment of the present invention will be described with reference to FIG. 1. FIG. 1a is a plan view of the seat pad 1 according to the first embodiment 1, and FIG. 1b is a diagram of the back surface of the seat pad 1. It is noted that in the embodiment, the seat pad 1 used for the seating portion of the front seat of an automobile will be described.

As illustrated in FIGS. 1a and 1b, the seat pad 1 includes a pad main body 2 formed of flexible foam made of a foamed, cured synthetic resin, holes 2a and 2b formed in a rectangular shape in planner view of the front surface and the back surface of the pad main body 2 and penetrated in the thickness direction (in the vertical direction of FIG. 1a on the paper surface), and three-dimensional mesh-like bodies 3 and 4 in a rectangular parallelepiped shape integrally set inside the holes 2a and 2b. In the seat pad 1, a wire (not illustrated) having a function of hanging a skin material (not illustrated), for example, is built in the pad main body 2, and a backing cloth (not illustrated) such as nonwoven fabric is integrally stacked on the back surface of the pad main body 2 for preventing the pad main body 2 from being damaged or preventing an unusual sound. In the seat pad 1, the front surface is covered with a cover material for a seat cover, and the seat pad is assembled on a mounting steel material (not illustrated) such as a frame.

The pad main body 2 is a member that forms the outer shape of the seat and exerts the cushioning property or the vibration absorbing property of the seat, and it is formed of flexible urethane foam in the embodiment. However, the material of the flexible foam is not limited to polyurethane, and it is of course possible to form flexible foam by foaming polyolefin such as polyethylene and polypropylene, polystyrene, polyvinyl chloride, or the like.

The holes 2a and 2b are portions inside which the three-dimensional mesh-like bodies 3 and 4 are set, and are penetrated through the pad main body 2 in the thickness direction. The three-dimensional mesh-like body 3 is disposed between the buttocks of a person who takes a seat to the knees, and the three-dimensional mesh-like body 4 is disposed on the right and left outer sides of the three-dimensional mesh-like body 3.

The three-dimensional mesh-like bodies 3 and 4 are a three-dimensional mesh-like structure formed of a plurality of three-dimensionally entangled fibers. The three-dimensional mesh-like bodies 3 and 4 are formed of a thermoplastic elastomer such as thermoplastic polyester elastomer and thermoplastic polyurethane elastomer, and fibers such as cotton, wool, rayon, nylon, and polyester, and include air permeability and elasticity. For methods for entangling fibers, the following method is adopted: a method for fulling fibers by adding any one kind or more of steam, heat, and pressure; a method for mechanically entangling fibers like a needle punch, for example; a method for attaching fibers to each other by pressing using various binders; a method for attaching fibers to each other by thermally pressing and fusing fibers themselves; and so on. In this manner, the rigidities of the three-dimensional mesh-like bodies 3 and 4 are set higher than the rigidity of the pad main body 2 by entangling fibers, and the densities are set smaller than the density of the pad main body 2. The three-dimensional mesh-like bodies 3 and 4 include a felt sheet, BREATHAIR (registered trademark), or the like.

Next, the cross sectional structure of the seat pad 1 will be described with reference to FIGS. 2 and 3. FIG. 2a is a cross sectional diagram of the end face of the seat pad 1 taken along line IIa-IIa in FIG. 1, FIG. 2b is a cross sectional diagram of the end face of the seat pad 1 taken along line IIb-IIb in FIG. 1, and FIG. 3 is a cross sectional view of the seat pad 1 taken along line III-III in FIG. 2b.

Figure 2B:
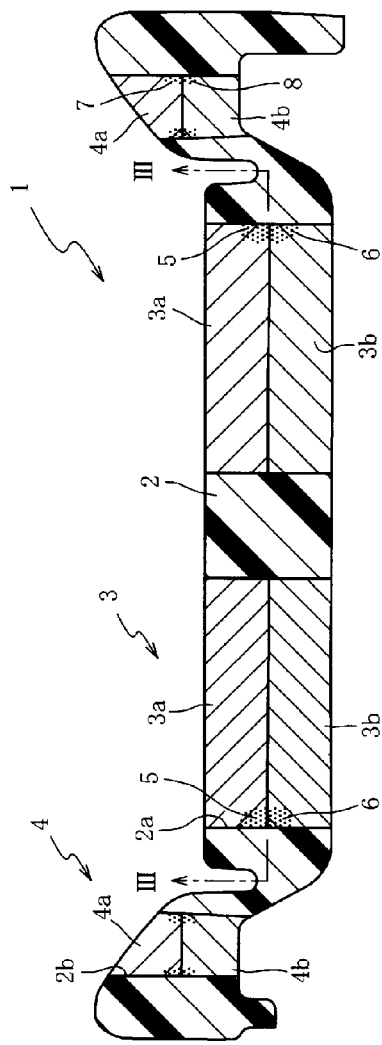
FIG. 2b is a cross sectional diagram of the end face of the seat pad taken along line IIb-IIb in FIG. 1.
Figure 3:
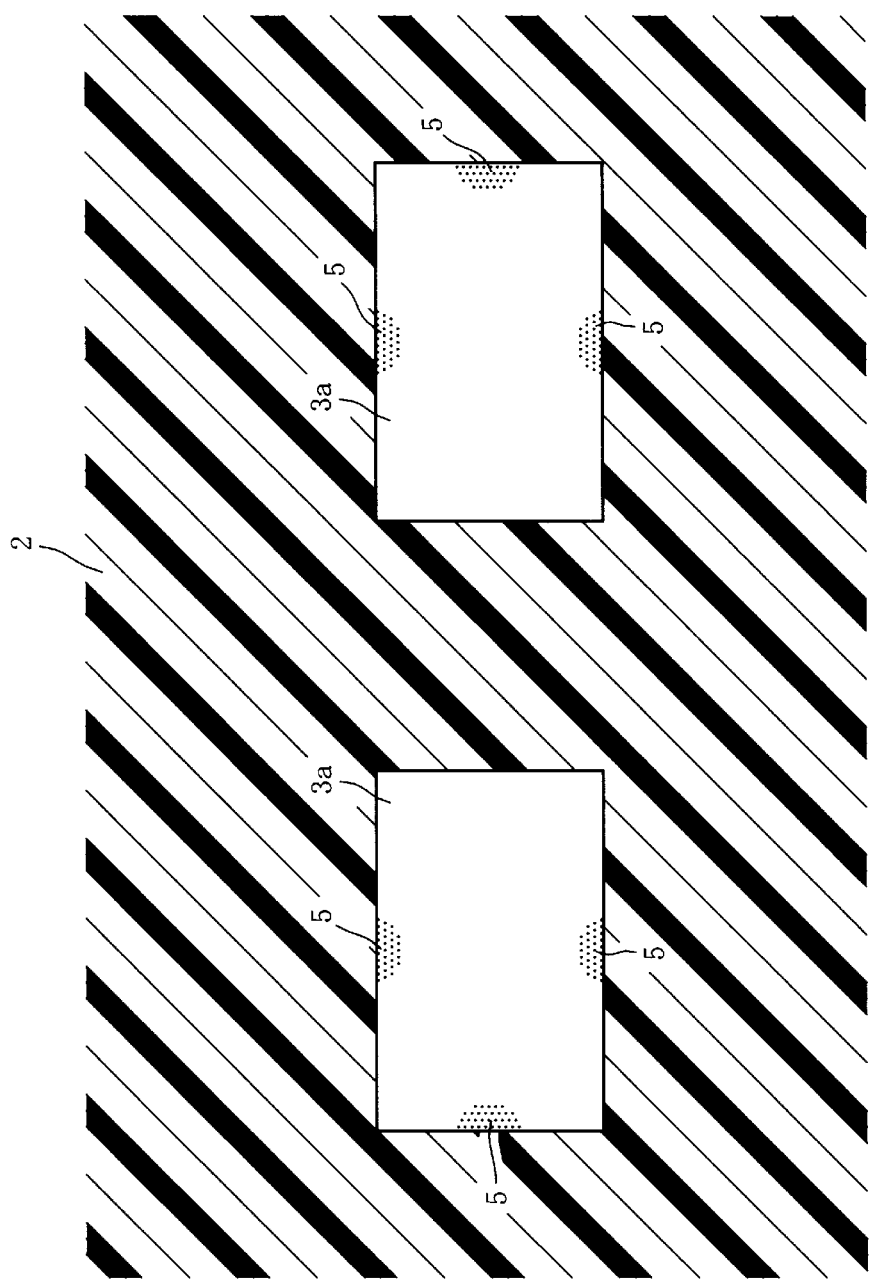
FIG. 3 It is a cross sectional view of the seat pad taken along line III-III in FIG. 2b.

As illustrated in FIGS. 2a and 2b, the three-dimensional mesh-like body 3 is formed of two split mesh-like bodies 3a and 3b split in the thickness, and the split mesh-like bodies 3a and 3b are set inside a hole 2a formed and penetrated through the pad main body 2 in the thickness direction (in the vertical direction in FIGS. 2a and 2b) as the end faces are touched to each other. Moreover, as illustrated in FIG. 2b, the three-dimensional mesh-like body 4 is formed of two split mesh-like bodies 4a and 4b split in the thickness, and the split mesh-like bodies 4a and 4b are set inside a hole 2b formed and penetrated through the pad main body 2 in the thickness direction as the end faces are touched to each other.

The three-dimensional mesh-like bodies 3 and 4 are split into two parts in the thicknesses to form two split mesh-like bodies 3a and 3b and two split mesh-like bodies 4a and 4b, so that the thicknesses of the split mesh-like bodies 3a, 3b, 4a, and 4b can be reduced. As a result, the dimensions of the individual split mesh-like bodies 3a, 3b, 4a, and 4b can be made smaller, so that the ease of handling can be improved. Moreover, the air permeability of the pad main body 2 in the thickness direction can be secured using the three-dimensional mesh-like bodies 3 and 4 and the holes 2a and 2b, so that a sweaty feeling experienced by the person who takes a seat can be suppressed. Furthermore, the densities of the three-dimensional mesh-like bodies 3 and 4 are set smaller than the density of the pad main body 2, so that the weight of the seat pad 1 can be reduced.

The split mesh-like body 3a is disposed on the front surface side of the pad main body 2, and a part of the side face (the back surface side of the pad main body 2) is attached to a portion near the center of the hole 2a in the depth direction (the pad main body 2) through a hardened side face layer 5. The split mesh-like body 3b is disposed on the back surface side of the pad main body 2, and a part of the side face (the front surface side of the pad main body 2) is attached to a portion near the center of the hole 2a in the depth direction (the pad main body 2) through a hardened side face layer 6. The split mesh-like body 4a is disposed on the front surface side of the pad main body 2, and a part of the side face (the back surface side of the pad main body 2) is attached to a portion near the center of the hole 2b in the depth direction (the pad main body 2) through a hardened side face layer 7. The split mesh-like body 4b is disposed on the back surface side of the pad main body 2, and a part of the side face (the front surface side of the pad main body 2) is attached to a portion near the center of the hole 2b in the depth direction (the pad main body 2) through a hardened side face layer 8.

The hardened side face layers 5, 6, 7, and 8 are layers that the liquid raw material of the pad main body 2 is hardened between fibers forming the split mesh-like bodies 3a, 3b, 4a, and 4b. The side faces of the split mesh-like bodies 3a, 3b, 4a, and 4b are attached to the inner surfaces of the holes 2a and 2b through the hardened side face layers 5, 6, 7, and 8, so that it is possible that the split mesh-like bodies 3a, 3b, 4a, and 4b are not easily displaced with respect to the pad main body 2. Therefore, it is possible to prevent such an event that the split mesh-like bodies 3a, 3b, 4a, and 4b drop off from the holes 2a and 2b in the process of assembling work of the seat pad 1, or the split mesh-like bodies 3a, 3b, 4a, and 4b are sunk into the pad main body 2 in use and comfortableness to sit is degraded.

As illustrated in FIG. 3, the hardened side face layer 5 is not provided entirely around the side face of the split mesh-like body 3a, and the hardened side face layer 5 is interspersed on the side face of the split mesh-like body 3a, and is discontinuously provided. In the embodiment, a pair of the split mesh-like bodies 3a in a rectangular parallelepiped shape is disposed on the left and right of the pad main body 2. In the side faces (four sides) of the pair of the split mesh-like bodies 3a, the hardened side face layer 5 is formed individually in the center part of three faces except the faces close to and opposite to each other. It is noted that the hardened side face layer 6 is formed also on the split mesh-like body 3b (see FIG. 2b) disposed on the back surface side of the split mesh-like body 3a at the same position as the split mesh-like body 3a.

The side faces of the split mesh-like bodies 3a and 3b are attached to the inner surface of the hole 2a through the hardened side face layers 5 and 6, so that it is possible that the split mesh-like bodies 3a and 3b are not easily displaced in the thickness direction with respect to the pad main body 2 when the pad main body 2 and the split mesh-like bodies 3a and 3b pressed in the thickness direction of the seat pad 1 are restored. Therefore, it is possible to prevent such events that the split mesh-like bodies 3a and 3b are sunk and that the person who takes a seat experiences an uncomfortable feeling.

Here, in the side faces (four sides) of the pair of the split mesh-like bodies 3a, the faces close to and opposite to each other are located in the center of the pad main body 2 in the lateral direction. The center of the pad main body 2 in the lateral direction is a portion on which the tensile force in the lateral direction acts because of the movement of the body weight of the person who takes a seat. When the hardened side face layer 5 that attaches the pad main body 2 to the split mesh-like body 3a is formed on the portion, there is concern that the hardened side face layer 5 transmits the tensile force in the lateral direction to the pad main body 2 and the split mesh-like body 3a and the pad main body 2 or the split mesh-like body 3a are broken. On the other hand, the hardened side face layer 5 located in the center of the pad main body 2 in the lateral direction is omitted, so that it is possible to prevent such events that the hardened side face layer 5 transmits the tensile force in the lateral direction to the pad main body 2 and the split mesh-like body 3a and that the pad main body 2 or the split mesh-like body 3a is broken.

Figure 5:
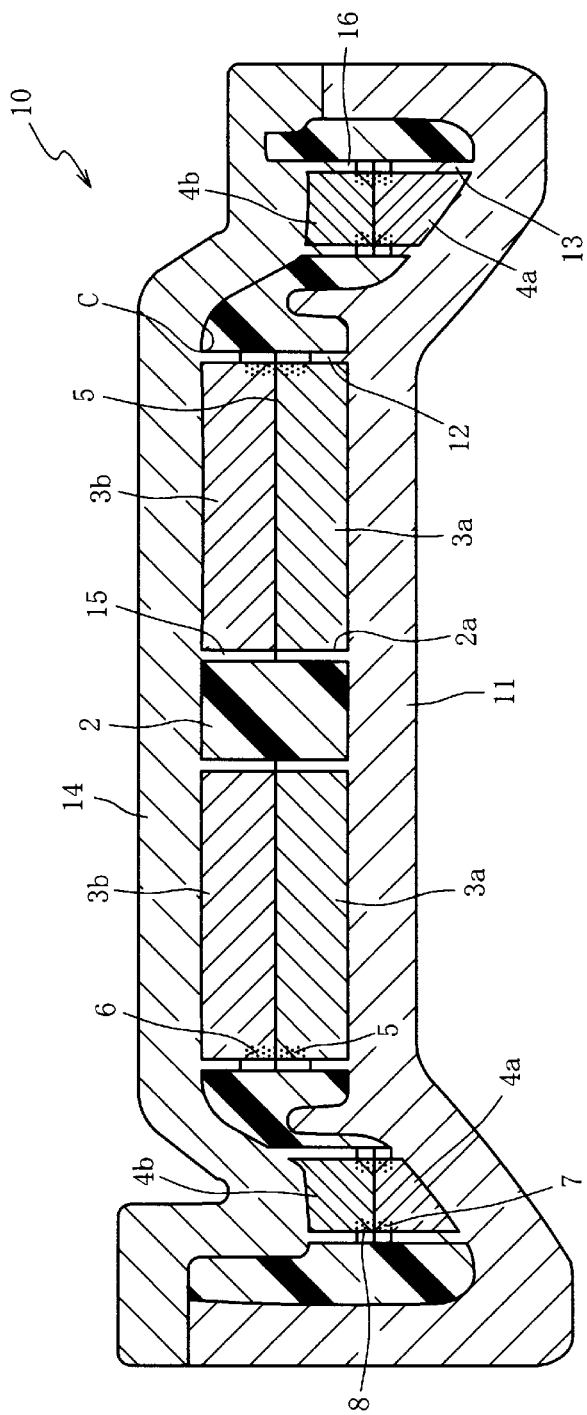
FIG. 5 It is a cross sectional diagram of the end face of the shaping mold in the process of foam molding.

Next, a method of manufacture of the seat pad 1 will be described with reference to FIGS. 4 and 5. FIG. 4a is a cross sectional diagram of the end face of a shaping mold 10 in which the split mesh-like bodies 3a and 3b are disposed on a lower mold 11 and an upper mold 14, FIG. 4b is a perspective view of a lower mold partitioning wall 12 disposed on the lower mold 11, and FIG. 5 is a cross sectional diagram of the end face of the shaping mold 10 in the process of foam molding (curing). It is noted that in FIGS. 4a and 5, a wire built in the pad main body 2, nonwoven fabric integrally stacked on the back surface of the pad main body 2, or the like is omitted in the drawings.

As illustrated in FIG. 4a, the lower mold partitioning walls 12 and 13 in a rectangular tubular shape having an opened top end are erected on a molding face 11a of the lower mold 11 forming the front surface (the seating face) of the pad main body 2. A pair of the lower mold partitioning walls 12 is arranged side by side on the right and left on the molding face 11a of the lower mold 11, and the lower mold partitioning wall 13 is disposed on both of the right and left sides of the lower mold partitioning wall 12. The lower mold partitioning walls 12 and 13 are portions into which the split mesh-like bodies 3a and 4a are inserted, respectively, and are set to have the size that the split mesh-like bodies 3a and 4a can be inserted. The heights of the lower mold partitioning walls 12 and 13 are almost the same as the heights of the split mesh-like bodies 3a and 4a, and are set to about a half of the thickness of the pad main body 2. The split mesh-like bodies 3a and 4a can be disposed at predetermined positions by inserting the split mesh-like bodies 3a and 4a into the lower mold partitioning walls 12 and 13, so that it is possible to prevent operation errors such as disposing the split mesh-like bodies 3a and 4a at wrong positions and the negligence of disposing the split mesh-like bodies 3a and 4a.

Similarly to the lower mold 11, upper mold partitioning walls 15 and 16 in a rectangular tubular shape having an opened rim edge are erected on a molding face 14a of the upper mold 14 forming the back surface of the pad main body 2 toward a cavity C. A pair of the upper mold partitioning walls 15 is arranged side by side on the right and left on the molding face 14a of the upper mold 14, and the upper mold partitioning wall 16 is disposed on both of the right and left sides of the upper mold partitioning wall 15. The upper mold partitioning walls 15 and 16 are portions into which the split mesh-like bodies 3b and 4b are inserted, respectively, and are set to have the size that the split mesh-like bodies 3b and 4b can be inserted. The heights of the upper mold partitioning walls 15 and 16 are almost the same as the heights of the split mesh-like bodies 3b and 4b, and set to about a half of the thickness of the pad main body 2.

The upper mold partitioning walls 15 and 16 are provided in such a manner that the lower ends are touched to the top ends of the lower mold partitioning walls 12 and 13, respectively, when the upper mold 14 is closed to hermetically seal the cavity C. When the split mesh-like bodies 3a and 4a are inserted into the inside of the lower mold partitioning walls 12 and 13, the split mesh-like bodies 3b and 4b are inserted into the inside of the upper mold partitioning walls 15 and 16, and the lower mold partitioning walls 12 and 13 are touched to the upper mold partitioning walls 15 and 16, the lower mold partitioning walls 12 and 13 and the upper mold partitioning walls 15 and 16 prevent the liquid raw material of flexible foam from contacting the side faces of the split mesh-like bodies 3a, 3b, 4a, and 4b. Moreover, a retainer (not illustrated) such as a pin is projected inside the upper mold partitioning walls 15 and 16.

The split mesh-like bodies 3b and 4b can be attached or temporarily attached to the inside of the upper mold partitioning walls 15 and 16 using the retainers, so that it is possible to prevent such an event that the split mesh-like bodies 3b and 4b drop off from the upper mold partitioning walls 15 and 16 before forming the pad main body 2.

It is noted that the retainer is not necessarily provided inside the upper mold partitioning walls 15 and 16. For example, when the split mesh-like bodies 3b and 4b are compressed from the lateral sides and press-fitted to the upper mold partitioning walls 15 and 16, the split mesh-like bodies 3b and 4b are fit into the upper mold partitioning walls 15 and 16, so that it is possible to prevent the split mesh-like bodies 3b and 4b from dropping even though the retainers are not used.

As illustrated in FIG. 4b, the lower mold partitioning wall 12 is formed with a notch portion 12b notched in a slit-shape from a top end 12a toward the molding face 11a (see FIG. 4a) along the height direction (the vertical direction in FIG. 4b). The notch portion 12b is a portion that exposes a part of the side faces of the split mesh-like bodies 3a, 3b, 4a, and 4b to the inside of the cavity C. The notch portion 12b is formed in a predetermined length from the top end 12a of the lower mold partitioning wall 12 to a portion not reaching the molding face 11a. The height from the molding face 11a to the lower end of the notch portion 12b is set to a predetermined value in a range of 10 to 30 mm.

The notch portion 12b is formed on three faces in four sides of the lower mold partitioning wall 12 erected on the molding face 11a except a face opposite to the lower mold partitioning wall 12 located next thereto. The lower mold partitioning wall 13 and the upper mold partitioning walls 15 and 16 are also formed with notch portions (not illustrated) as similar to the lower mold partitioning wall 12.

In order to foam-mold the seat pad 1 using the shaping mold 10, as illustrated in FIG. 4a, first, the split mesh-like bodies 3a and 4a are inserted into the inside of the lower mold partitioning walls 12 and 13, respectively, and the split mesh-like bodies 3a and 4a are disposed on the molding face 11a of the lower mold 11. Subsequently, an injector (not illustrated) is used to inject a flexible foam liquid raw material into the lower mold 11, and then the upper mold 14 is closed to hermetically seal the cavity C while touching the split mesh-like bodies 3a and 4a to the split mesh-like bodies 3b and 4b, and then the liquid raw material is filled in the cavity C while being foamed. In this manner, the liquid raw material is foamed and filled in the cavity C, and the pad main body 2 made of flexible foam is foamed and formed as illustrated in FIG. 5.

The liquid raw material injected into the lower mold 11 and the liquid raw material in the midway point of being foamed are penetrated between the fibers of the split mesh-like bodies 3a, 3b, 4a, and 4b through the notch portion 12b, and hardened between the fibers of the split mesh-like bodies 3a, 3b, 4a, and 4b by heating the shaping mold 10. Thus, the hardened side face layers 5, 6, 7, and 8, which the liquid raw material is hardened, are formed on the side faces of the split mesh-like bodies 3a, 3b, 4a, and 4b. The split mesh-like bodies 3a, 3b, 4a, and 4b are attached to and integrally formed with the pad main body 2 through the hardened side face layers 5, 6, 7, and 8. After molding, the upper mold 14 is opened and removed, and the seat pad 1 is obtained in which the split mesh-like bodies 3a, 3b, 4a, and 4b are penetrated through the pad main body 2 in the thickness direction.

When the seat pad 1 is manufactured as described above, the liquid raw material is contacted with a part of the side faces of the split mesh-like bodies 3a, 4a, 3b, and 4b using the lower mold partitioning walls 12 and 13 and the upper mold partitioning walls 15 and 16 through the notch portions 12b. As a result, the liquid raw material is hardened between the fibers on the side faces of the split mesh-like bodies 3a, 4a, 3b, and 4b, so that the hardened side face layers 5, 6, 7, and 8 can be formed and attached to the side faces of the split mesh-like bodies 3a, 4a, 3b, and 4b. The side faces of the split mesh-like bodies 3a, 4a, 3b, and 4b are attached to the pad main body 2, so that it is possible to prevent such an event that the split mesh-like bodies 3a, 4a, 3b, and 4b are displaced with respect to the pad main body 2 or drop. Moreover, the split mesh-like bodies 3a, 4a, 3b, and 4b follow the pad main body 2 through the hardened side face layers 5, 6, 7, and 8 when the pad main body 2 and the split mesh-like bodies 3a, 4a, 3b, and 4b pressed in the thickness direction of the seat pad 1 are restored, so that it is possible that the split mesh-like bodies 3a, 4a, 3b, and 4b are not easily displaced in the thickness direction with respect to the pad main body 2. Thus, the split mesh-like bodies 3a, 4a, 3b, and 4b can be prevented from being sunk, so that it is possible that the person who takes a seat hardly experiences an uncomfortable feeling.

Furthermore, in order to secure the air permeability of the pad main body 2 in the thickness direction, the three-dimensional mesh-like body is not provided entirely in the thickness direction of the pad main body 2, and the split mesh-like bodies 3a, 4a, 3b, and 4b are used in which the three-dimensional mesh-like body is split into two parts in the thickness. The split mesh-like bodies 3a, 4a, 3b, and 4b are inserted into the inside of the lower mold partitioning walls 12 and 13 and the upper mold partitioning walls 15 and 16 provided on the lower mold 11 and the upper mold 14, respectively, to hermetically seal the cavity C, and it is suppressed that the liquid raw material contacts the side faces of the split mesh-like bodies 3a, 4a, 3b, and 4b using the lower mold partitioning walls 12 and 13 and the upper mold partitioning walls 15 and 16. Thus, it is possible to facilitate the disposition work and the mold removing work of the three-dimensional mesh-like bodies 3 and 4 (the split mesh-like bodies 3a, 4a, 3b, and 4b) in the cavity C.

Suppose that in the case where the three-dimensional mesh-like bodies 3 and 4 are not split into two parts, the partitioning wall inside which the three-dimensional mesh-like bodies 3 and 4 are accommodated is necessary to have the height almost the same as the height of the three-dimensional mesh-like bodies 3 and 4. When the mold is removed, since it is necessary to slide the mold by the height of the partitioning wall with respect to the pad main body (the flexible foam), a defect such as a tear is prone to occur on the pad main body because of the friction between the pad main body and the partitioning wall.

On the other hand, the split mesh-like bodies 3a, 3b, 4a, and 4b are used in which the three-dimensional mesh-like bodies 3 and 4 are split into two parts, so that the heights of the lower mold partitioning walls 12 and 13 and the upper mold partitioning walls 15 and 16 can be made about a half of the thickness of the pad main body 2. On that account, the amount of sliding the upper mold 14 and the lower mold 11 with respect to the pad main body 2 can be made about a half, as compared with the case where the three-dimensional mesh-like bodies 3 and 4 are not split into two parts when the mold is removed. As a result, it is possible that a defect such as a tear does not easily occur on the pad main body 2 when the mold is removed.

Moreover, the split mesh-like bodies 3a, 3b, 4a, and 4b are provided in which the three-dimensional mesh-like bodies 3 and 4 are split into two parts, so that the heights of the lower mold partitioning walls 12 and 13 and the upper mold partitioning walls 15 and 16 can be reduced according to the split mesh-like bodies 3a, 3b, 4a, and 4b. On that account, the split mesh-like bodies 3a, 3b, 4a, and 4b can be easily inserted into the inside of the lower mold partitioning walls 12 and 13 and the upper mold partitioning walls 15 and 16. Therefore, it is possible to improve the workability of disposing the split mesh-like bodies 3a, 3b, 4a, and 4b on the shaping mold 10.

Furthermore, the liquid raw material contacts the split mesh-like bodies 3a, 3b, 4a, and 4b through the notch portions 12b formed on the lower mold partitioning walls 12 and 13 and the upper mold partitioning walls 15 and 16. Therefore, the hardened side face layers 5, 6, 7, and 8 formed on the side faces of the split mesh-like bodies 3a, 3b, 4a, and 4b can be interspersed and discontinuous in the circumferential direction of the side faces of the split mesh-like bodies 3a, 3b, 4a, and 4b. As a result, it is possible to suppress a stiff touch caused by the hardened side face layers 5, 6, 7, and 8 harder than the three-dimensional mesh-like bodies 3 and 4 or the pad main body 2, as compared with the case where the hardened side face layers 5, 6, 7, and 8 are continuously provided (continued) around the side faces of the split mesh-like bodies 3a, 3b, 4a, and 4b. Therefore, it is possible to reduce an uncomfortable feeling experienced by the person who takes a seat and to improve comfortableness to sit.

In addition, since the liquid raw material contacts a part of the side faces of the split mesh-like bodies 3a, 3b, 4a, and 4b through the notch portions 12b formed on the lower mold partitioning walls 12 and 13 and the upper mold partitioning walls 15 and 16, the hardened side face layers 5, 6, 7, and 8 are partially formed on the side faces (the boundary) of the split mesh-like bodies 3a, 3b, 4a, and 4b. As a result, it is possible to prevent such an event that the air permeability in the thickness direction provided by the split mesh-like bodies 3a, 3b, 4a, and 4b is impaired because of the formation of the hardened side face layers 5, 6, 7, and 8.

Moreover, the notch portion 12b is formed in a predetermined length from the top end 12a of the lower mold partitioning wall 12 to a portion not reaching the molding face 11a, and the height from the molding face 11a to the lower end of the notch portion 12b is set to a predetermined value in a range of 10 to 30 mm. When the split mesh-like bodies 3a and 4a are inserted into the inside of the lower mold partitioning walls 12 and 13 and then a liquid raw material of flexible foam is injected into the lower mold 11, the lower mold partitioning walls 12 and 13 prevent the contact of the liquid raw material immediately after the injection to the side faces of the split mesh-like bodies 3a and 4a.

Although depending on the size of the shaping mold 10 or the material of the flexible foam, the liquid raw material injected into the shaping mold 10 is collected in a depth of 10 to 20 mm on the molding face 11a of the lower mold 11 immediately after the injection into the shaping mold 10. In a period from before foaming to the initial stage of foaming (about zero to five seconds after the injection although depending on reactivity), since the viscosity of the liquid raw material is relatively low, the liquid raw material is easily penetrated between the fibers of the split mesh-like bodies 3a and 4a. Therefore, the position of the lower end of the notch portion 12b is set above the liquid level of the liquid raw material collected on the molding face 11a, and the liquid raw material immediately after the injection is prevented from being entered into the lower mold partitioning walls 12 and 13 through the notch portions 12b. More specifically, the height from the molding face 11a to the lower end of the notch portion 12b is set to the range of 10 to 30 mm. Thus, it is possible to prevent such an event that the liquid raw material immediately after the injection and before foamed is penetrated into the split mesh-like bodies 3a and 4a.

It is noted that the liquid raw material in the midway point of being foamed contacts the side faces of the split mesh-like bodies 3a and 4a through the notch portions 12b, and the hardened side face layers 5 and 7 are formed. The hardened side face layers 5 and 7 are provided apart from the front surfaces of the split mesh-like bodies 3a and 4a by the height of the notch portion 12b, it is possible to provide a gap between the front surfaces of the split mesh-like bodies 3a and 4a and the hardened side face layers 5 and 7. As a result, it is possible that the person who takes a seat hardly experiences a stiff sensation or an uncomfortable feeling caused by the hardened side face layers 5 and 7.

Figure 6B:
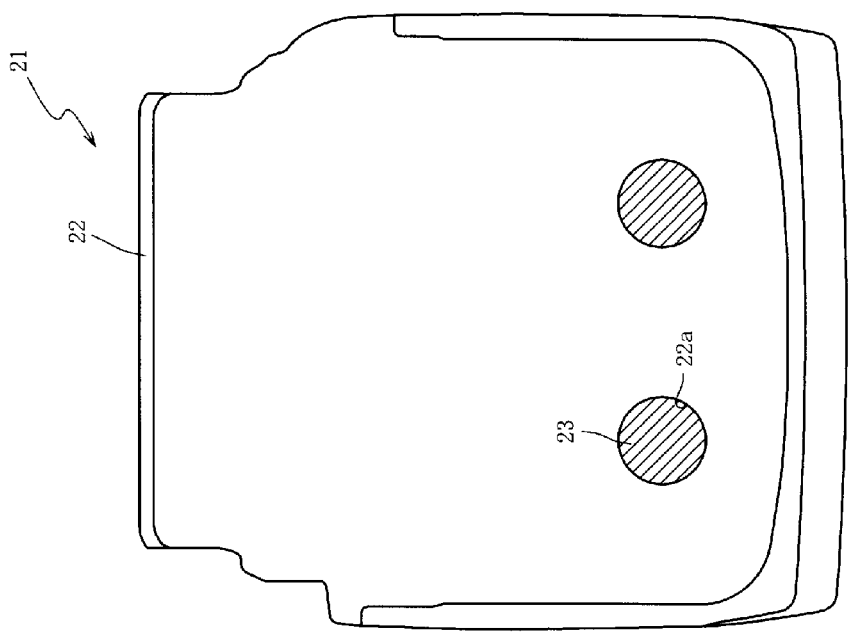
FIG. 6b is a diagram of the back surface of the seat pad.
Figure 6A:
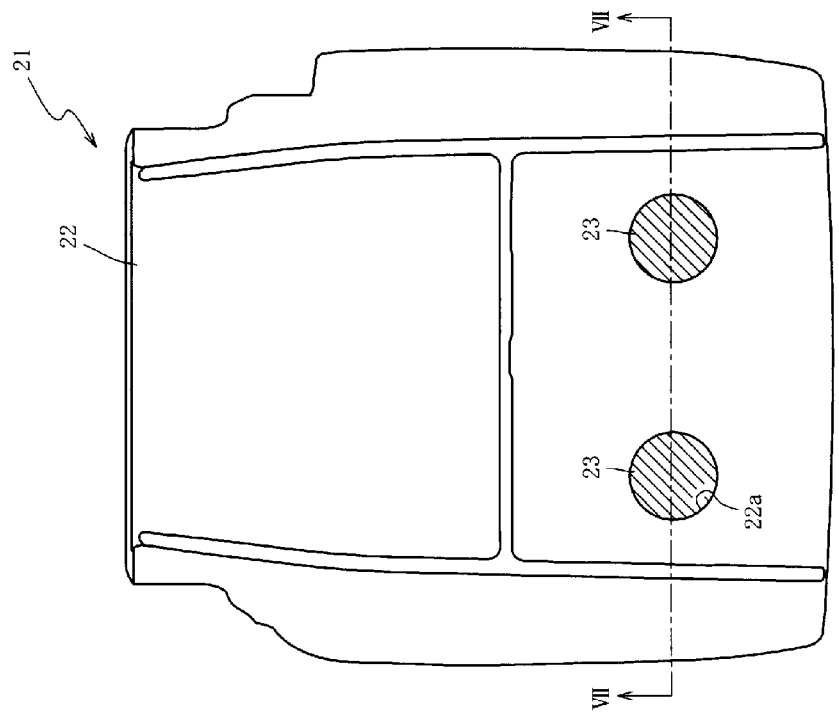
FIG. 6a is a plan view of a seat pad according to a second embodiment.

Next, a second embodiment will be described with reference to FIGS. 6 to 9. In the first embodiment, the case is described where the hardened side face layers 5, 6, 7, and 8 are formed so as to be interspersed on the side faces of the three-dimensional mesh-like bodies 3 and 4 (the split mesh-like bodies 3a, 3b, 4a, and 4b). On the other hand, in the second embodiment, the case will be described where hardened side face layers 25 and 26 are continuously formed around the side face of a three-dimensional mesh-like body 23 (split mesh-like bodies 23a and 23b). It is noted that portions the same as the portions described in the first embodiment are designated the same reference numerals and signs, and the following description is omitted. First, a seat pad 21 according to the second embodiment will be described with reference to FIG. 6. FIG. 6a is a plan view of the seat pad 21 according to the second embodiment, and FIG. 6b is a diagram of the back surface of the seat pad 21. It is noted that also in the second embodiment, the seat pad 21 used for the seating portion of the front seat of an automobile will be described.

As illustrated in FIGS. 6a and 6b, the seat pad 21 includes a pad main body 22 formed of flexible foam made of a foamed synthetic resin, a hole 22a formed as penetrated from the front surface of the pad main body 22 to the back surface in the thickness direction and having the outer shape in a circular shape, and a cylindrical three-dimensional mesh-like body 23 integrally set inside the hole 22a.

Figure 7:
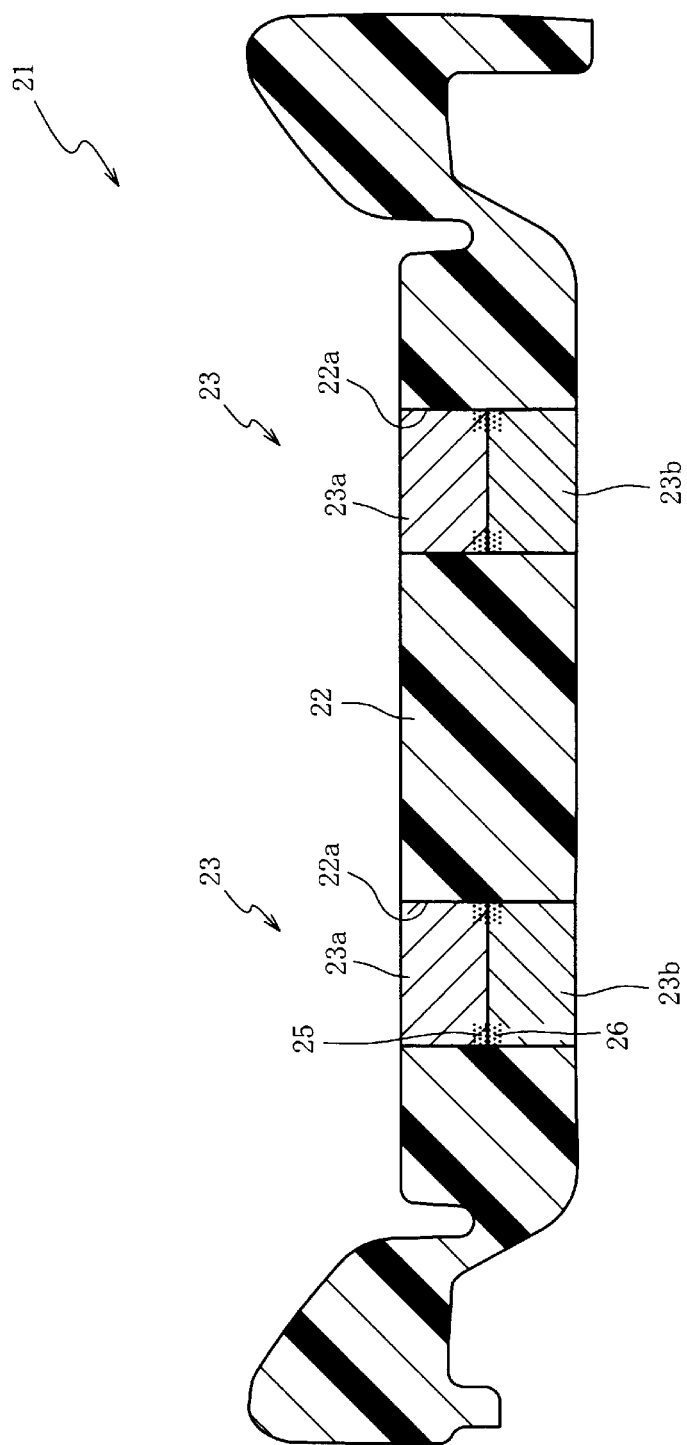
FIG. 7 It is cross sectional diagram of the end face of the seat pad taken along line VII-VII in FIG. 6.

Next, the cross sectional structure of the seat pad 21 will be described with reference to FIG. 7. FIG. 7 is a cross sectional diagram of the end face of the seat pad 21 taken along line VII-VII in FIG. 6a. As illustrated in FIG. 7, the three-dimensional mesh-like body 23 is formed of the split mesh-like bodies 23a and 23b split into roughly two parts in the thickness direction of the pad main body 22, and the split mesh-like bodies 23a and 23b are set inside the hole 22a formed and penetrated through the pad main body 22 in the thickness direction in the state in which the end faces are touched to each other. The air permeability of the pad main body 22 in the thickness direction can be secured using the three-dimensional mesh-like body 23 (the split mesh-like bodies 23a and 23b) and the hole 22a, so that a sweaty feeling experienced by the person who takes a seat can be suppressed.

The split mesh-like body 23a is disposed on the front surface side of the pad main body 22 (on the upper side in FIG. 7), and the side face on the back surface side (on the lower side in FIG. 7) is attached to the inner surface of the hole 22a through the hardened side face layer 25. The split mesh-like body 23b is disposed on the back surface side of the pad main body 22 (on the lower side in FIG. 7), and the side face on the front surface side (on the upper side in FIG. 7) is attached to the inner surface of the hole 22a through the hardened side face layer 26. The hardened side face layers 25 and 26 are layers that the liquid raw material of the pad main body 22 is hardened between fibers forming the split mesh-like bodies 23a and 23b. The side faces of the split mesh-like bodies 23a and 23b are attached to the inner surface of the hole 22a through the hardened side face layers 25 and 26, so that it is possible that the split mesh-like bodies 23a and 23b are not easily displaced with respect to the pad main body 22.

Moreover, in the split mesh-like body 23a, the side face on the back surface side (on the lower side in FIG. 7) is attached to the inner surface of the hole 22a through the hardened side face layer 25, so that it is possible to prevent such an event that the hardened side face layer 25 is not exposed on the front surface of the pad main body 22. When the liquid raw material of flexible foam is hardened between the fibers of the split mesh-like body 23a, the boundary (the hardened layer) of the hardened split mesh-like body 23a is cured. However, the hardened side face layer 25 is not provided on the front surface of the split mesh-like body 23a, so that it is possible to prevent such an event that a stiff touch or an uncomfortable feeling occurs on the front surface of the seat pad 21.

Figure 9:
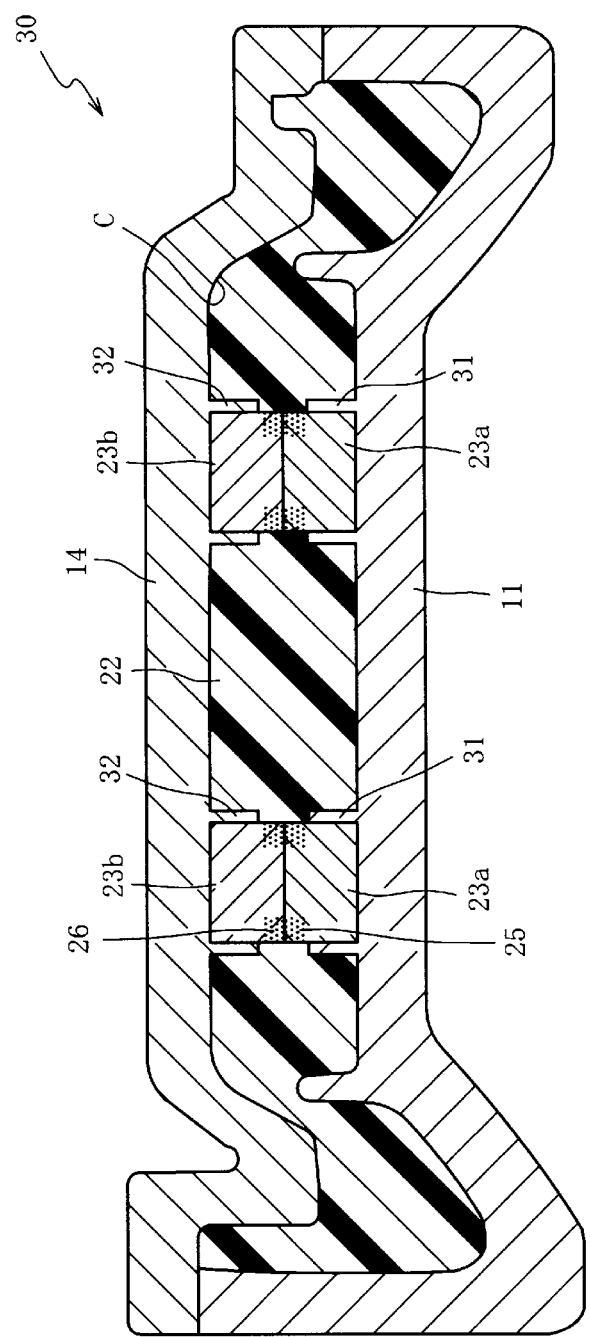
FIG. 9 It is a cross sectional diagram of the end face of the shaping mold in the process of foam molding.

Next, a method of manufacture of the seat pad 21 will be described with reference to FIGS. 7, 8a, 8b, and 9. FIG. 8a is a cross sectional diagram of the end face of a shaping mold 30 in which the split mesh-like bodies 23a and 23b are disposed on a lower mold 11 and an upper mold 14, FIG. 8b is a perspective view of a lower mold partitioning wall 32 disposed on the lower mold 11, and FIG. 9 is a cross sectional diagram of the end face of the shaping mold 30 in the process of foam molding (curing). It is noted that in FIGS. 8a and 9, a wire built in the pad main body 22, nonwoven fabric integrally stacked on the back surface of the pad main body 22, or the like is omitted in the drawings.

As illustrated in FIG. 8a, in the shaping mold 30, a lower mold partitioning wall 31 in a nearly cylindrical shape having an opened top end is erected on a molding face 11a of the lower mold 11 forming the front surface (the seating face) of the pad main body 22 is formed. The lower mold partitioning wall 31 is a portion into which the split mesh-like body 23a is inserted, and the inner diameter is set slightly greater than the outer diameter of the split mesh-like body 23a. As illustrated in FIG. 8b, the height of the lower mold partitioning wall 31 is set slightly smaller than the height of the split mesh-like body 23a. In the embodiment, the lower mold partitioning wall 31 is set to have the height at which the liquid raw material is not over the height immediately after the injection onto the molding face 11a of the lower mold 11 (30 mm, for example).

In the shaping mold 30, the upper mold partitioning wall 32 in a nearly cylindrical shape having the opened lower end is erected on the molding face 14a of the upper mold 14 forming the back surface of the pad main body 22 toward a cavity C. The upper mold partitioning wall 32 is a portion into which the split mesh-like body 23b is inserted, and the inner diameter is set slightly greater than the outer diameter of the split mesh-like body 23b. As similar to the lower mold partitioning wall 31, the height of the upper mold partitioning wall 32 is also set slightly smaller than the height of the split mesh-like body 23b. The upper mold partitioning wall 32 is provided on the end face of the split mesh-like body 23a disposed on the lower mold partitioning wall 31 at a position at which the end face of the split mesh-like body 23b disposed on the upper mold partitioning wall 32 can be contacted when the upper mold 14 is closed to hermetically seal the cavity C. Moreover, a retainer (not illustrated) such as a pin is projected inside the upper mold partitioning wall 32. The split mesh-like body 23b can be attached or temporarily attached to the inside of the upper mold partitioning wall 32 using the retainer, so that it is possible to prevent the split mesh-like body 23b from dropping off from the upper mold partitioning wall 32 before forming the pad main body 22. It is noted that it is similar to the first embodiment that the retainer is not necessarily provided.

In order to foam-mold the seat pad 21 using the shaping mold 30, as illustrated in FIG. 8a, first, the split mesh-like body 23a is inserted into the inside of the lower mold partitioning wall 31 erected on the molding face 11a of the lower mold 11, and the split mesh-like body 23b is inserted into the inside of the upper mold partitioning wall 32 erected on the molding face 14a of the upper mold 14. Subsequently, when an injector (not illustrated) is used to inject a flexible foam liquid raw material into the lower mold 11 and then the upper mold 14 is closed to hermetically seal the cavity C, the liquid raw material is filled in the cavity C while being foamed. In this manner, the liquid raw material is foamed and filled in the cavity C, and the pad main body 22 made of flexible foam is foamed and formed as illustrated in FIG. 9.

The liquid raw material injected into the lower mold 11 and the liquid raw material in the midway point of being foamed contact portions projecting from the lower mold partitioning wall 31 and the upper mold partitioning wall 32 in the split mesh-like bodies 23a and 23b. Thus, the liquid raw material is hardened between fibers on the side faces of the split mesh-like bodies 23a and 23b exposed from the lower mold partitioning wall 31 and the upper mold partitioning wall 32, the hardened side face layers 25 and 26 are formed, and the split mesh-like bodies 23a and 23b are integrally formed with the pad main body 22. After molding, the upper mold 14 is opened and removed, and the seat pad 21 is obtained in which the split mesh-like bodies 23a and 23b are penetrated through the pad main body 22 in the thickness direction.

It is noted that in the seat pad 21, a gap is formed between the side faces of the split mesh-like bodies 23a and 23b and the pad main body 22 by the thicknesses of the lower mold partitioning wall 31 and the upper mold partitioning wall 32 in the shaping mold 30. The gap is filled because of the elasticity of the pad main body 22, and the side faces of the split mesh-like bodies 23a and 23b are held because of the elasticity of the pad main body 22.

Moreover, the lower mold partitioning wall 31 can prevent the front surface of the split mesh-like body 23a from contacting the liquid raw material, so that it is possible to prevent the hardened side face layer 25 from appearing on the front surface of the split mesh-like body 23a. Therefore, it is possible that the person who takes a seat hardly experiences a stiff sensation or an uncomfortable feeling caused by the hardened layer exposed on the front surface of the seat pad 21.

It is noted that according to the embodiment, the hardened side face layers 25 and 26 are continuously provided in a band shape entirely around the split mesh-like bodies 23a and 23b, so that it is possible to increase the area of the split mesh-like bodies 23a and 23b attached to the pad main body 22. As a result, it is possible to firmly attach the split mesh-like bodies 23a and 23b to the pad main body 22, and it is possible to improve the durability of the seat pad 21.

Next, a third embodiment will be described with reference to FIG. 10a. In the second embodiment, the case is described where the lower mold partitioning wall 31 and the upper mold partitioning wall 32 are set lower than the heights of the split mesh-like bodies 23a and 23b, and the hardened side face layers 25 and 26 are formed entirely around the split mesh-like bodies 23a and 23b. On the other hand, in the third embodiment, the case will be described where notch portions 41b and 42b are formed on a lower mold partitioning wall 41 and an upper mold partitioning wall 42 and a hardened side face layer is formed through the notch portions 41b and 42b.

It is noted that since the third embodiment is the same as the second embodiment other than the lower mold partitioning wall 41 and the upper mold partitioning wall 42, portions other than the lower mold partitioning wall 41 and the upper mold partitioning wall 42 are omitted in the drawings, portions the same as the portions described in the second embodiment are designated the same reference numerals and signs, and the following description is omitted. FIG. 10a is a perspective view of the lower mold partitioning wall 41 and the upper mold partitioning wall 42 of a shaping mold that forms a seat pad according to the third embodiment, and schematically illustrates the state of the lower mold partitioning wall 41 and the upper mold partitioning wall 42 when a cavity C (see FIG. 9) is hermetically seal as the plate thicknesses of the partitioning walls are ignored (the same thing is applied in FIGS. 10b and 10c, and FIG. 11a to FIG. 11c)

As illustrated in FIG. 10a, the heights of the lower mold partitioning wall 41 and the upper mold partitioning wall 42 are set to almost the same as the heights of the split mesh-like bodies 23a and 23b, and the notch portions 41b and 42b are formed which are notched in a predetermined length from a top end 41a and a rim edge 42a to a portion not reaching molding faces 11a and 14a (see FIG. 8a) along the height direction. The notch portions 41b and 42b are provided at three places in the circumferential direction of the lower mold partitioning wall 41 and the upper mold partitioning wall 42 as spaced from one another, and are provided at positions at which the notch portions communicate with each other when the cavity C is hermetically sealed. Moreover, the notch portions 41b and 42b are set in almost the same width from the top end 41a of the lower mold partitioning wall 41 to the rim edge 42a of the upper mold partitioning wall 42 in the height direction.

The lower mold partitioning wall 41 and the upper mold partitioning wall 42 are configured as described above, so that it is possible to form hardened side face layers (not illustrated) at the positions of the notch portions 41b and 42b with respect to the split mesh-like bodies 23a and 23b. The hardened side face layers are discontinuously interspersed at three places on the split mesh-like bodies 23a and 23b in the circumferential direction because of the notch portions 41b and 42b, so that it is possible that the person who takes a seat hardly experiences an uncomfortable feeling caused by the hardened side face layer.

Furthermore, the hardened side face layers are formed along the height (thickness) direction of the split mesh-like bodies 23a and 23b because of the notch portions 41b and 42b, so that it is possible to prevent such an event that the split mesh-like bodies 23a and 23b are displaced and sunk with respect to the pad main body 22 in the case where a load is applied in the thickness direction of the pad main body 22 (see FIG. 7) and the split mesh-like bodies 23a and 23b.

More specifically, the hardened side face layer is formed on the back surface side of the split mesh-like body 23a, so that it is prevented that a hard hardened side face layer appears on the front surface side of the split mesh-like body 23a, and it is possible to suppress that the person who takes a seat experiences an uncomfortable feeling. Moreover, the hardened side face layer is formed on the front surface side of the split mesh-like body 23b, so that it is possible to prevent such an event that the split mesh-like body 23b is sunk from the front surface side of the split mesh-like bodies 23a and 23b caused by the application of a load because of the body weight of the person who takes a seat. As a result, it is possible to also prevent such an event that the split mesh-like body 23a located on the front surface side of the split mesh-like body 23b is sunk.

Next, a fourth embodiment will be described with reference to FIG. 10b. In the third embodiment, the case is described where the notch portions 41b and 42b in the same size are formed on the lower mold partitioning wall 41 and the upper mold partitioning wall 42. On the other hand, in the fourth embodiment, the case will be described where a notch portion 51b formed on a lower mold partitioning wall 51 is smaller than a notch portion 42b formed on an upper mold partitioning wall 42. It is noted that since the fourth embodiment is the same as the third embodiment other than the lower mold partitioning wall 51, portions other than the lower mold partitioning wall 51 and the upper mold partitioning wall 42 are omitted in the drawings, portions the same as the portions described in the second embodiment and the third embodiment are designated the same reference numerals and signs, and the following description is omitted. FIG. 10b is a perspective view of the lower mold partitioning wall 51 and the upper mold partitioning wall 42 of a shaping mold that forms a seat pad according to the fourth embodiment.

As illustrated in FIG. 10b, the height of the lower mold partitioning wall 51 is set to almost the same as the height of a split mesh-like body 23a, and a notch portion 51b is formed, which is notched in a predetermined length from a top end 51a to a portion not reaching a molding face 11a (see FIG. 8a) along the height direction. The width of the notch portion 51b in the circumferential direction is set smaller than the notch portion 42b formed on the upper mold partitioning wall 42, and the notch portion 51b is provided at a position at which the notch portion 51b communicates with the notch portion 42b when a cavity C is hermetically sealed.

The area of the opening of the notch portion 51b formed on the lower mold partitioning wall 51 is set smaller than the area of the opening of the notch portion 42b formed on the upper mold partitioning wall 42, so that the liquid raw material of flexible foam injected into a lower mold 11 (see FIG. 8a) can hardly contact the split mesh-like body 23a. Therefore, it is possible to reduce the amount of the liquid raw material penetrated between the fibers of the split mesh-like body 23a through the notch portions 51b. As a result, it is possible to reduce the thickness of a hard hardened side face layer formed on the side face of the split mesh-like body 23a. The thickness of the hardened side face layer of the split mesh-like body 23a located on the front surface side of the seat pad can be reduced, so that it is possible that the person who takes a seat further hardly experiences an uncomfortable feeling caused by the hardened side face layer.

Next, a fifth embodiment will be described with reference to FIG. 10c. In the fourth embodiment, the case is described where the notch portion 51b formed on the lower mold partitioning wall 51 is smaller than the notch portion 42b formed on the upper mold partitioning wall 42. In the fifth embodiment, the case will be described where a notch portion 52b formed on an upper mold partitioning wall 52 is extended in the height direction. It is noted that since the fifth embodiment is the same as the fourth embodiment other than the upper mold partitioning wall 52, portions other than a lower mold partitioning wall 51 and the upper mold partitioning wall 52 are omitted in the drawings, portions the same as the portions described in the second embodiment and the fourth embodiment are designated the same reference numerals and signs, and the following description is omitted. FIG. 10c is a perspective view of the lower mold partitioning wall 51 and the upper mold partitioning wall 52 of a shaping mold that forms a seat pad according to the fifth embodiment.

As illustrated in FIG. 10c, the height of the upper mold partitioning wall 52 is set to almost the same as the height of the split mesh-like body 23b, and the notch portion 52b is formed, which is notched in the length from a rim edge 52a to a molding face 14a (see FIG. 8a) along the height direction. The width of the notch portion 52b in the circumferential direction is set smaller than the notch portion 51b formed on the lower mold partitioning wall 51, and the notch portion 52b is provided at a position at which the notch portion 52b communicates with the notch portion 51b when a cavity C is hermetically sealed.

Since the notch portion 52b is formed in the length from the rim edge 52a of the upper mold partitioning wall 52 to the molding face 14a, a hardened side face layer is formed in the height direction of the split mesh-like body 23b. As a result, the split mesh-like body 23b located on the back surface side of the seat pad can be attached to the pad main body 22 entirely in the height direction. Thus, it is possible to increase the area of the split mesh-like body 23b attached to the pad main body 22, and it is possible to secure durability. Moreover, the notch portions 51b and 52b are interspersed in the circumferential direction of the split mesh-like bodies 23a and 23b, so that it is possible that the person who takes a seat hardly experiences an uncomfortable feeling caused by the hardened side face layer.

Figure 11A:
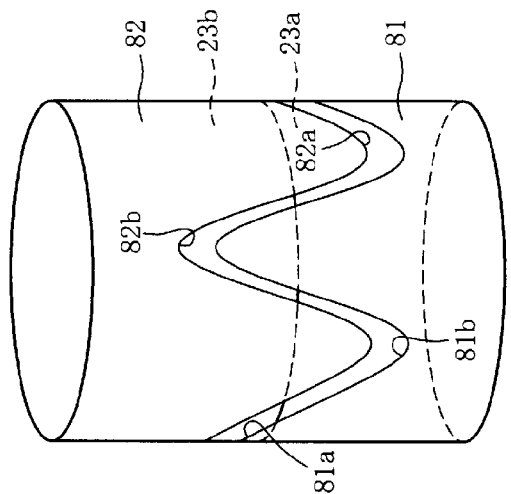
FIG. 11a is a perspective view of a lower mold partitioning wall and an upper mold partitioning wall of a shaping mold that forms a seat pad according to a sixth embodiment.

Next, a sixth embodiment will be described with reference to FIG. 11a. In the fifth embodiment, the case is described where the notch portion 52b is formed entirely in the height direction of the upper mold partitioning wall 52. On the other hand, in the sixth embodiment, the case will be described where a notch portion 61b formed on a lower mold partitioning wall 61 is formed entirely in the height direction of the lower mold partitioning wall 61. It is noted that since the sixth embodiment is the same as the fourth embodiment other than the lower mold partitioning wall 61, portions other than the lower mold partitioning wall 61 and an upper mold partitioning wall 42 are omitted in the drawings, portions the same as the portions described in the second embodiment and the fourth embodiment are designated the same reference numerals and signs, and the following description is omitted. FIG. 11a is a perspective view of the lower mold partitioning wall 61 and the upper mold partitioning wall 42 of a shaping mold that forms a seat pad according to the sixth embodiment.

As illustrated in FIG. 11a, the height of the lower mold partitioning wall 61 is set to almost the same as the height of a split mesh-like body 23a, and a notch portion 61b is formed, which is notched in the length from a top end 61a to a molding face 11a (see FIG. 8a) along the height direction. The notch portion 61b is formed at two places in the circumferential direction of the lower mold partitioning wall 61 (at positions opposite to each other), and the width of the notch portion 61b in the circumferential direction is set smaller than a notch portion 42b formed on the upper mold partitioning wall 42. Moreover, the notch portion 61b is provided at a location different from the notch portion 42b (at a location displaced in the circumferential direction) when a cavity C is hermetically sealed.

Since the notch portion 61b is formed in the length from the top end 61a of the lower mold partitioning wall 61 to the molding face 11a, a hardened side face layer is formed entirely in the height direction of the split mesh-like body 23a. As a result, the split mesh-like body 23a located on the front surface side of the seat pad can be attached to the pad main body 22 entirely in the height direction. Thus, it is possible to increase the area of the split mesh-like body 23a attached to the pad main body 22, and it is possible to secure durability.

Moreover, the width of the notch portion 61b in the circumferential direction is set smaller than the notch portion 42b formed on the upper mold partitioning wall 42, so that it is possible that the width of the hardened side face layer in the circumferential direction formed on the split mesh-like body 23a is made smaller than the width of the hardened side face layer in the circumferential direction formed on the split mesh-like body 23b. Although the split mesh-like body 23a is located on the front surface side of the seat pad, the width of the hard hardened side face layer is reduced, so that it is possible to reduce an uncomfortable feeling experienced by the person who takes a seat.

Furthermore, the notch portion 61b is provided at a location different from the notch portion 42b (at a location displaced in the circumferential direction) when the cavity C is hermetically sealed, so that it is possible that the positions of the hardened side face layers formed on the split mesh-like bodies 23a and 23b are discontinuous with respect to the height direction (the thickness direction) of the split mesh-like bodies 23a and 23b. As a result, it is possible to prevent such an event that the hardened side face layers formed on the split mesh-like bodies 23a and 23b interfere with each other caused by the application of a load in the thickness direction of the split mesh-like bodies 23a and 23b. Accordingly, it is possible to suppress that the person who takes a seat experiences an uncomfortable feeling caused by the hardened side face layers.

Figure 11B:
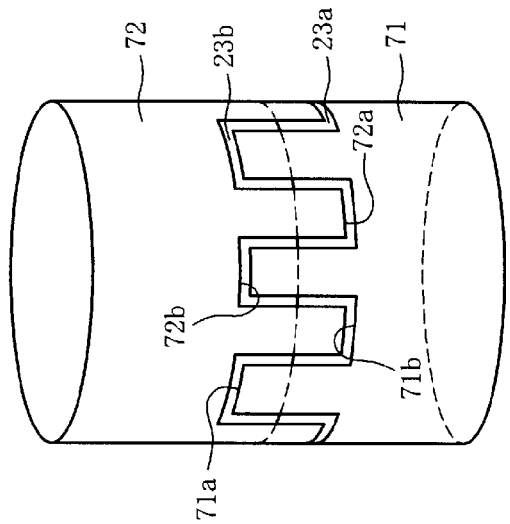
FIG. 11b is a perspective view of a lower mold partitioning wall and an upper mold partitioning wall of a shaping mold that forms a seat pad according to a seventh embodiment.

Next, a seventh embodiment will be described with reference to FIG. 11b. In the third embodiment to the sixth embodiment, the case is described where the lower mold partitioning walls 41, 51, and 61 and the upper mold partitioning walls 42 and 52 are set to have the height almost the same as the heights of the split mesh-like bodies 23a and 23b. On the other hand, in the seventh embodiment, the case will be described where a lower mold partitioning wall 71 and an upper mold partitioning wall 72 are set higher than split mesh-like bodies 23a and 23b. It is noted that since the seventh embodiment is the same as the second embodiment other than the lower mold partitioning wall 71 and the upper mold partitioning wall 72, portions other than the lower mold partitioning wall 71 and the upper mold partitioning wall 72 are omitted in the drawings, portions the same as the portions described in the second embodiment are designated the same reference numerals and signs, and the following description is omitted. FIG. 11b is a perspective view of the lower mold partitioning wall 71 and the upper mold partitioning wall 72 of a shaping mold that forms a seat pad according to the seventh embodiment.

As illustrated in FIG. 11b, the heights of the lower mold partitioning wall 71 and the upper mold partitioning wall 72 are set greater than the heights of the split mesh-like bodies 23a and 23b, and notch portions 71b and 72b notched in a rectangular shape are formed from a top end 71a and a rim edge 72a to molding faces 11a and 14a (see FIG. 8a) along the height direction. The notch portions 71b and 72b are formed entirely in the circumferential direction of the top end 71a of the lower mold partitioning wall 71 and the rim edge 72a of the upper mold partitioning wall 72 at regular spacings, and are formed in the sizes in which the notch portions 71b and 72b alternately engage with the top end 71a and the rim edge 72a when a cavity C is hermetically sealed. Moreover, a gap is formed between the notch portions 71b and 72b and the top end 71a and the rim edge 72a in the height direction and in the circumferential direction when the cavity C is hermetically sealed.

Hardened side face layers are formed in a zigzag shape entirely in the circumferential direction of the split mesh-like bodies 23a and 23b because of the gap. More specifically, the hardened side face layers are formed alternately and linearly in the circumferential direction and in the thickness direction of the split mesh-like bodies 23a and 23b across the split mesh-like bodies 23a and 23b. Thus, it is possible that the split mesh-like bodies 23a and 23b are not easily displaced against a load applied to the seat pad in the lateral direction and in the vertical direction.

Figure 11C:
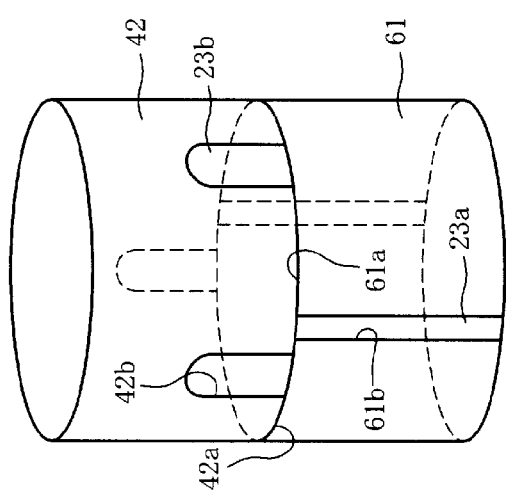
FIG. 11c is a perspective view of a lower mold partitioning wall and an upper mold partitioning wall of a shaping mold that forms a seat pad according to an eighth embodiment.

Next, an eighth embodiment will be described with reference to FIG. 11c. In the seventh embodiment, the case is described where the notch portions 71b and 72b in a rectangular shape are formed on the lower mold partitioning wall 71 and the upper mold partitioning wall 72. On the other hand, in the eighth embodiment, the case will be described where notch portions 81b and 82b in an arc shape are formed on a lower mold partitioning wall 81 and an upper mold partitioning wall 82. It is noted that since the eighth embodiment is the same as the second embodiment other than the lower mold partitioning wall 81 and the upper mold partitioning wall 82, portions other than the lower mold partitioning wall 81 and the upper mold partitioning wall 82 are omitted in the drawings, portions the same as the portions described in the second embodiment are designated the same reference numerals and signs, and the following description is omitted. FIG. 11c is a perspective view of the lower mold partitioning wall 81 and the upper mold partitioning wall 82 of a shaping mold that forms a seat pad according to the eighth embodiment.

As illustrated in FIG. 11c, the heights of the lower mold partitioning wall 81 and the upper mold partitioning wall 82 are set greater than the heights of split mesh-like bodies 23a and 23b, and notch portions 81b and 82b in an arc shape are formed, which are notched from a top end 71a and a rim edge 72a to portions not reaching molding faces 11a and 14a (see FIG. 8a). The notch portions 81b and 82b are formed at regular spacings entirely in the circumferential direction of a top end 81a of the lower mold partitioning wall 81 and a rim edge 82a of the upper mold partitioning wall 82, and are formed in the sizes in which the notch portions 81b and 82b alternately engage with the top end 81a and the rim edge 82a when a cavity C is hermetically sealed. Moreover, a gap is formed between the notch portions 81b and 82b and the top end 81a and the rim edge 82a in the height direction when the cavity C is hermetically sealed.

Hardened side face layers are formed in a zigzag shape entirely in the circumferential direction of the split mesh-like bodies 23a and 23b because of the gap. More specifically, the hardened side face layers are formed in a meander shape in the circumferential direction of the split mesh-like bodies 23a and 23b across the split mesh-like bodies 23a and 23b. Thus, it is possible that the split mesh-like bodies 23a and 23b are not easily displaced against a load applied to the seat pad in the lateral direction and in the vertical direction. Moreover, the notch portions 81b and 82b are formed in an arc shape, so that it is possible to prevent such an event that the lower mold partitioning wall 81 interferes with the upper mold partitioning wall 82 when the cavity C is hermetically sealed even in the shaping mold in which the lower mold 11 is joined to the upper mold 14 using a hinge member (not illustrated), and it is possible to easily perform mold clamping work.

Figure 12:
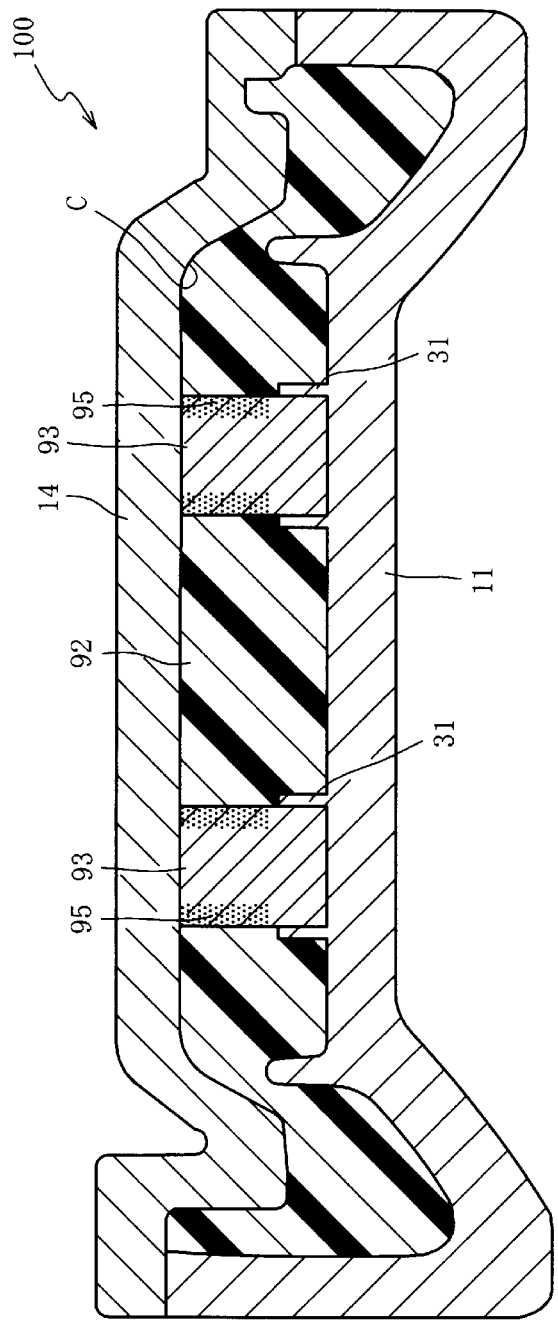
FIG. 12 It is a cross sectional diagram of the end face of the shaping mold in the process of foam molding a seat pad according to a ninth embodiment.

Next, a ninth embodiment will be described with reference to FIG. 12. In the first embodiment to the eighth embodiment, the case is described where the seat pad is formed using the split mesh-like body in which the three-dimensional mesh-like body is split into two parts. On the other hand, in the ninth embodiment, the case will be described where a seat pad is formed using a three-dimensional mesh-like body 93 in the thickness almost the same as the thickness of a pad main body 92. It is noted that portions the same as the portions described in the second embodiment are designated the same reference numerals and signs, and the following description is omitted. FIG. 12 is a cross sectional diagram of the end face of a shaping mold 100 in the process of foam molding (curing) a seat pad according to the ninth embodiment.

As illustrated in FIG. 12, in the shaping mold 100, a lower mold partitioning wall 31 in a nearly cylindrical shape having an opened top end is erected on a molding face 11a of a lower mold 11 forming the front surface (the seating face) of the pad main body 92. The lower mold partitioning wall 31 is a portion into which the three-dimensional mesh-like body 93 is inserted, and the inner diameter is set slightly greater than the outer diameter of the three-dimensional mesh-like body 93.

In order to foam-mold the seat pad using the shaping mold 100, first, the three-dimensional mesh-like body 93 is inserted into the inside of the lower mold partitioning wall 31 erected on the molding face 11a of the lower mold 11. Subsequently, an injector (not illustrated) is used to inject a flexible foam liquid raw material into the lower mold 11, and then an upper mold 14 is closed to hermetically seal a cavity C, and the end face of the three-dimensional mesh-like body 93 is brought into intimate contact with the upper mold 14. The liquid raw material fills the inside of the cavity C while being foamed, and the pad main body 92 made of the flexible foam is foamed and formed.

The liquid raw material injected into the lower mold 11 and the liquid raw material in the midway point of being foamed contact a portion projecting from the lower mold partitioning wall 31 in the three-dimensional mesh-like body 93. Thus, the liquid raw material is hardened between fibers on the side face of the three-dimensional mesh-like body 93 exposed from the lower mold partitioning wall 31, a hardened side face layer 95 is formed, and the three-dimensional mesh-like body 93 is integrally formed with the pad main body 92. After molding, the upper mold 14 is opened and removed, and the seat pad is obtained in which the three-dimensional mesh-like body 93 is penetrated through the pad main body 92 in the thickness direction.

It is noted that the cavity C is hermetically sealed, and the end face of the three-dimensional mesh-like body 93 is brought into intimate contact with the upper mold 14, so that it is possible to prevent such an event that the liquid raw material in the midway point of being foamed contacts the end face of the three-dimensional mesh-like body 93. As a result, such an event is prevented that the liquid raw material is hardened between fibers on the end face of the three-dimensional mesh-like body 93, so that it is possible to secure the air permeability of the three-dimensional mesh-like body 93 in the thickness direction.

Moreover, the lower mold partitioning wall 31 can prevent the front surface of the three-dimensional mesh-like body 93 from contacting the liquid raw material, so that it is possible to prevent the hardened side face layer 95 from appearing on the front surface of the three-dimensional mesh-like body 93. Therefore, it is possible to prevent such an event that a stiff sensation or an uncomfortable feeling occurs, which is caused by the hardened layer exposed the front surface of the seat pad.

EXAMPLES

Next, the present invention will be described more in detail according to experimental examples. It is noted that the present invention is not limited to these experimental examples.

Experimental Example 1

A cylindrical lower mold partitioning wall (the inner diameter is 68 mm and the height is 50 mm) is fixed to the molding face of the lower mold of a metal shaping mold. In an upper mold, a cylindrical upper mold partitioning wall (the inner diameter is 68 mm and the height is 50 mm) is projected toward a cavity. A slit-shaped notch portion in a length of 35 mm and a width of 3 mm is formed at four places at regular spacings in the circumferential direction from the top end of the opened lower mold partitioning wall along the height direction. Similarly, a slit-shaped notch portion in a length of 35 mm and a width of 3 mm is formed at four places at regular spacings in the circumferential direction from the rim edge of the opened upper mold partitioning wall along the height direction.

A cylindrical split mesh-like body (made of a felt sheet) in an outer diameter of 70 mm and a height of 50 mm is fit into the lower mold partitioning wall and the upper mold partitioning wall. The upper mold is closed to hermetically seal the cavity (the thickness is about 100 mm), and then the end faces of the split mesh-like bodies inserted into the inside of the lower mold partitioning wall and the upper mold partitioning wall are contacted to each other, and the notch portions communicate with each other.

The split mesh-like bodies were disposed on the lower mold partitioning wall and the upper mold partitioning wall, a liquid raw material of polyurethane was poured onto the molding face of the lower mold, and the upper mold was closed. The liquid raw material was foamed and filled in the cavity, the shaping mold was heated, and flexible foam (a pad main body) made of foamed polyurethane in a thickness of about 100 mm was formed and cured. Thus, a seat pad according to experimental example 1 was obtained in which the split mesh-like body is penetrated through the pad main body in the thickness direction.

Experimental Example 2

A seat pad according to experimental example 2 was obtained using a shaping mold similarly configured as experimental example 1 except that the lower mold partitioning wall and the upper mold partitioning wall are not provided. The seat pad according to experimental example 2 is different from the seat pad according to experimental example 1 in that the split mesh-like body (the three-dimensional mesh-like body) is not provided on the pad main body.

Experimental Example 3

A seat pad according to experimental example 3 was obtained by inserting a cylindrical three-dimensional mesh-like body (made of a felt sheet) having a diameter of 70 mm and a height of 100 mm into a hole on flexible foam made of foamed polyurethane (a pad main body in a thickness of 100 mm) in which a single hole (an inner diameter of 70 mm) in a circular shape in the cross section is formed and penetrated in the thickness direction. It is noted that a skin is formed on the wall surface of the hole on the pad main body.

Experimental Example 4

A cylindrical three-dimensional mesh-like body (made of a felt sheet) having a diameter of 70 mm and a height of 100 mm was erected on the molding face of the lower mold of the shaping mold, a liquid raw material of a polyurethane was poured onto the molding face of the lower mold, and the upper mold was closed. The liquid raw material was foamed and filled in the cavity, the shaping mold was heated, and flexible foam (a pad main body) made of foamed polyurethane in a thickness of about 100 mm was formed and cured. Thus, a seat pad according to experimental example 4 was obtained in which the three-dimensional mesh-like body was integrally formed entirely in the thickness direction of the pad main body.

(Measurement of Density)

The mass (the density) per unit volume was measured for the seat pads. It is noted that for the mass of the three-dimensional mesh-like body included in the seat pads, the mass was 7 g in experimental example 1, and experimental examples 3 and 4 (0 g in experimental example 2).

(Measurement of Hardness)

In compliance with JASO B408 (JIS K6401 in version 2011), the seat pads were pressed in the vertical direction (the thickness direction) in a strain amount 75% of the initial thickness using a pressure plate in a diameter of 200 mm, the load was immediately removed, and then the seat pads were immediately pressed in a strain amount 25% of the initial thickness. A load (a hardness of 25%) was read after a lapse of 20 seconds subsequent to a standstill. Subsequently, the seat pads were pressed in a strain amount 50% of the initial thickness, and a load (a hardness of 50%) was read after a lapse of 20 seconds subsequent to a standstill.

(Compression Deflection)

In compliance with JASO B408 (JIS K6401 in version 2011), an initial load of 5 N was applied to the seat pads using a pressure plate in a diameter of 200 mm, and the thickness (the initial thickness) was measured. The center point on the pressure plane at this time was set to the origin point (the coordinates), a pressure was applied at a velocity of 150 mm/minute, and a deflection with respect to the load was determined.

Figure 13:
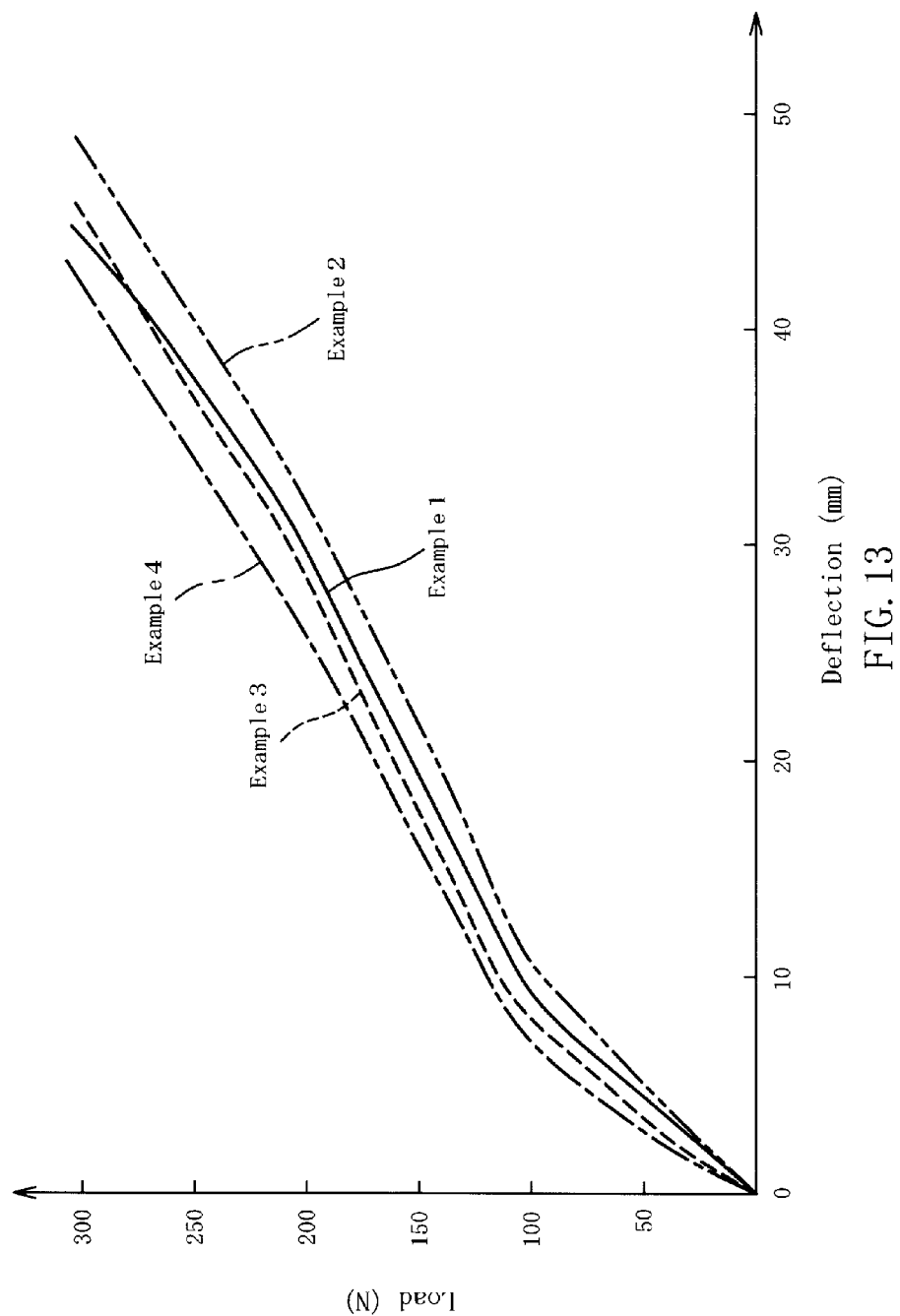
FIG. 13 It is compression deflection curves of seat pads according to experimental examples.

Table 1 is a list of the seat pads according to the experimental examples in the density, a hardness of 25%, and a hardness of 50%, and FIG. 13 is compression deflection curves in which the seat pads according to the experimental examples are pressed in the vertical direction (the thickness direction).

TABLE 1

| | | Example 1 | Example 2 | Example 3 | Example 4 |
|---|---|---|---|---|---|
| Density | (kg/m$^3$) | 39 | 39 | 39 | 39 |
| Hardness (25%) | (N) | 150 | 144 | 156 | 173 |
| Hardness (50%) | (N) | 305 | 276 | 301 | 326 |

It is revealed from Table 1 and FIG. 13 that experimental example 2 is the softest among the seat pad this time and the slope of the compression deflection curve is the smallest. Moreover, it is revealed that experimental example 4 is the hardest among the seat pad this time and the slope of the compression deflection curve is the greatest. This is because experimental example 2 does not include the three-dimensional mesh-like body, and in experimental example 4, the liquid raw material of flexible foam is filled in the three-dimensional mesh-like body to form the hardened layer on the three-dimensional mesh-like body and the three-dimensional mesh-like body is integrally formed with (attached to) the pad main body in the thickness direction.

Moreover, it is revealed from Table 1 and FIG. 13 that experimental example 3 is softer than experimental example 4 and the slope of the compression deflection curve is also smaller. This is because in experimental example 3, the three-dimensional mesh-like body is inserted into the hole on flexible foam made of foamed polyurethane (the pad main body) on which the hole is formed and penetrated in the thickness direction, so that experimental example 3 is different from experimental example 4 in that the hardened layer is not included which the liquid raw material of flexible foam is filled in the three-dimensional mesh-like body and hardened.

It is revealed that experimental example 1 is softer than experimental example 3 and the slope of the compression deflection curve is also smaller. This is because in experimental example 1, the liquid raw material is foam-molded in the state in which the three-dimensional mesh-like body (the split mesh-like body) is inserted into the inside of the lower mold partitioning wall and the upper mold partitioning wall, so that it is possible to prevent the liquid raw material from contacting the side face of the split mesh-like body to form the hardened layer other than on the notch portions, and it is possible to prevent a skin from being formed on the boundary between the three-dimensional mesh-like body and the pad main body.

As described above, according to experimental example 1, the hardness was enabled to come close to experimental example 2 in which the three-dimensional mesh-like body is not included as compared with experimental examples 3 and 4 in which the three-dimensional mesh-like body is held on the pad main body. Therefore, according to experimental example 1, it is apparent that the air permeability as well as the cushioning property and the vibration absorbing property can be secured in which the hardened side face layer is formed through the notch portions to integrally form the three-dimensional mesh-like body (the split mesh-like body) with the pad main body.

As described above, the present invention is described based on the embodiments. However, the present invention is not limited to the embodiments at all, and it can be easily conjectured that the present invention can be improved and modified in the scope not deviating from the teachings of the present invention. For example, the numbers and positions of the three-dimensional mesh-like bodies 3, 23, and 93 disposed on the seat pads 1 and 21 can be appropriately set.

In the foregoing embodiments, the seat pad (a front cushion pad) used for the seating portion of the front seat of an automobile is described. However, the present invention is not necessarily limited thereto, and it is of course possible that this technique is applied to other seat pads. The other seat pads include seat pads used for the backrest portion of the front seat of an automobile and the seating portion or the backrest portion of a rear seat, for example. Moreover, other than the seats of the automobile, it is of course possible that the present invention is applied to seat pads used for the seats of vehicles such as ships and aircrafts and for furniture seats.

In the foregoing embodiments, the case is described where the three-dimensional mesh-like bodies 3, 23, and 93 are formed in a rectangular parallelepiped shape or in a cylindrical shape. However, the present invention is not necessarily limited thereto, and it is of course possible that the three-dimensional mesh-like body is set in a given shape according to the size or the shape of the seat pad.

In the foregoing embodiments, the case is described where the lower mold partitioning walls 12, 13, 31, 41, 51, 61, 71, and 81 and the upper mold partitioning walls 15, 16, 32, 42, 72, and 82 are in a cylindrical shape or in a rectangular tubular shape. However, the present invention is not necessarily limited thereto, and it is of course possible that the shapes of the lower mold partitioning wall and the upper mold partitioning wall are appropriately set according to the shape of the three-dimensional mesh-like body (the split mesh-like body).

In the foregoing embodiments, the case is described where the lower mold partitioning walls 12, 13, 31, 41, 51, 61, 71, and 81 and the upper mold partitioning walls 15, 16, 32, 42, 72, and 82 are integrally formed with the lower mold 11 and the upper mold 14. However, the present invention is not necessarily limited thereto, and it is of course possible that the lower mold partitioning wall or the upper mold partitioning wall is formed as members separate from the lower mold 11 or the upper mold 14 and the lower mold partitioning wall or the upper mold partitioning wall is disposed and fixed to the lower mold 11 or the upper mold 14. Moreover, it is of course possible that the lower mold partitioning wall or the upper mold partitioning wall is detachably fixed to the lower mold 11 or the upper mold 14. In the case where the lower mold partitioning wall or the upper mold partitioning wall is detachably fixed to the lower mold 11 or the upper mold 14, it is possible that when the seat pad formed using the shaping mold is removed, the lower mold partitioning wall or the upper mold partitioning wall is integrally formed with the seat pad, and removed out of the shaping mold. In this case, the lower mold partitioning wall or the upper mold partitioning wall is removed from the seat pad removed out of the mold, and the seat pad is completed.

In the foregoing third embodiment to the fifth embodiment, the case is described where three of the notch portions 41*b*, 51*b*, 42*b*, and 52*b* are formed on the lower mold partitioning walls 41 and 51 and the upper mold partitioning walls 42 and 52. However, the present invention is not limited thereto. The number of the notch portions can be appropriately set according to the shape and size of the three-dimensional mesh-like body, for example. Similarly, the number of the notch portion 61*b* of the lower mold partitioning wall 61 described in the sixth embodiment can also be appropriately set.

Although the description is omitted in the foregoing embodiments, it is of course possible that a core mold (not illustrated) is provided on the upper mold 14 depending on the type of the seat pad. For example, the core mold is provided as vertically movable by a drive unit (not illustrated) provided on the upper mold 14, and the core mold is set in such a manner that the core mold is removed out of the upper mold 14 and opened by being vertically moved using the drive unit.

It is noted that it may be fine that the foregoing embodiments are configured as modified in which a part or a plurality of portions of the configurations included in another embodiment is added to an embodiment or replaced by a part or a plurality of portions of the configurations of an embodiment, for example.

It is noted that the foregoing embodiments also disclose the following invention.

A seat pad A1 including: a pad main body formed of flexible foam made of a foamed synthetic resin; a hole (2*a*, 2*b*, 22*a*) penetrated through the pad main body in a thickness direction; and a three-dimensional mesh-like body formed of a plurality of three-dimensionally entangled fibers, a side face of the three-dimensional mesh-like body being held on the hole. In the seat pad, a hardened side face layer (5, 6, 7, 8, 25, 26, 95) is included that the liquid raw material of flexible foam is hardened between the fibers of the three-dimensional mesh-like body to attach a part of the side face of the three-dimensional mesh-like body to the pad main body.

In the seat pad A1, a seat pad A2 is characterized in that the hardened side face layer is formed except a portion from the front surface of the three-dimensional mesh-like body to a portion not reaching a back surface of the three-dimensional mesh-like body in a predetermined depth.

In the seat pad A1 or A2, a seat pad A3 characterized in that the hardened side face layer is discontinuously provided on the side face of the three-dimensional mesh-like body.

According to the seat pad A1, the pad main body is formed of flexible foam made of a foamed synthetic resin, and the hole is penetrated through the pad main body in the thickness direction. The side face of the three-dimensional mesh-like body formed of a plurality of three-dimensionally entangled fibers is held on the hole, so that the air permeability of the pad main body in the thickness direction can be secured because of the three-dimensional mesh-like body. Accordingly, it is possible to suppress a sweaty feeling.

Moreover, the hardened side face layer that the liquid raw material of flexible foam is hardened between the fibers of the three-dimensional mesh-like body attaches a part of the side face of the three-dimensional mesh-like body to the pad main body. Therefore, an effect is exerted that it is possible that the three-dimensional mesh-like body is not easily displaced with respect to the pad main body.

According to the seat pad A2, the hardened side face layer is formed except a portion from the front surface of the three-dimensional mesh-like body to a portion not reaching the back surface of the three-dimensional mesh-like body in a predetermined depth. Although the hardened side face layer becomes harder than the three-dimensional mesh-like body or the pad main body because the liquid raw material is hardened, the hardened side face layer is not provided from the front surface of the three-dimensional mesh-like body to a portion not reaching the back surface in a predetermined depth, so that an effect is exerted that it is possible that the touch of the front surface of the three-dimensional mesh-like body is improved, and the person who takes a seat hardly experiences an uncomfortable, in addition to the effect of the seat pad A1.

According to the seat pad A3, the hardened side face layer is discontinuously provided on the side face of the three-dimensional mesh-like body. The three-dimensional mesh-like body or the pad main body can be deformed between the discontinuous hardened side face layers, so that an effect is exerted that it is possible to reduce an uncomfortable feeling experienced by the person who takes a seat caused by a hardened side face layer harder than the three-dimensional mesh-like body or the pad main body and to improve comfortableness to sit in addition to the effect of the seat pad A1 or A2, as compared with the case where the hardened side face layer is continuously provided on the side face of the three-dimensional mesh-like body.

The invention claimed is:

1. A method of manufacture of a seat pad comprising the steps of:
    disposing a mesh body wherein a three-dimensional mesh body formed of a plurality of three-dimensionally entangled fibers is disposed on a tubular lower mold partitioning wall having an opened top end, the lower mold partitioning wall being erected on a molding face of a lower mold onto which a liquid raw material of foam made of a synthetic resin is poured with a part of a side face of the three-dimensional mesh body exposed with respect to the lower mold partitioning wall;
    forming a cavity wherein while forming the cavity as an upper mold is laid over the lower mold on which the three-dimensional mesh body is disposed in the step of disposing the mesh body, the three-dimensional mesh body is fixed in the cavity; and
    molding wherein the liquid raw material is foamed in the cavity formed in the step of forming the cavity to mold a pad main body formed of the foam and the three-dimensional mesh body is penetrated through the pad main body in a thickness direction;
    wherein the step of disposing the mesh body includes the steps of:
    disposing the lower mold wherein one of split mesh bodies that the three-dimensional mesh body is split into two parts in thickness is inserted into an inside of the lower mold partitioning wall; and
    disposing the upper mold wherein the other split mesh body is disposed on a molding face of the upper mold, and
    wherein in the step of forming the cavity, the one split mesh body inserted into the inside of the lower mold partitioning wall is touched to the other split mesh body disposed on the upper mold.

2. The method of manufacture of a seat pad according to claim 1,
    wherein the lower mold partitioning wall includes a notch portion notched from the top end toward the molding face along a height direction.

3. The method of manufacture of a seat pad according to claim 2,
    wherein the notch portion is formed in a predetermined length from a top end of the lower mold partitioning wall to a portion not reaching the molding face.

4. The method of manufacture of a seat pad according to claim 3,
    wherein the upper mold includes a tubular upper mold partitioning wall erected on the molding face and opened toward the cavity, and
    wherein in the step of disposing the upper mold, the other split mesh body is disposed with a part of a side face of the other split mesh body exposed with respect to the upper mold partitioning wall.

5. The method of manufacture of a seat pad according to claim 2,
    wherein the upper mold includes a tubular upper mold partitioning wall erected on the molding face and opened toward the cavity, and
    wherein in the step of disposing the upper mold, the other split mesh body is disposed with a part of a side face of the other split mesh body exposed with respect to the upper mold partitioning wall.

6. The method of manufacture of a seat pad according to claim 1,
    wherein the upper mold includes a tubular upper mold partitioning wall erected on the molding face and opened toward the cavity, and
    wherein in the step of disposing the upper mold, the other split mesh body is disposed as a part of a side face of the other split mesh body is exposed with respect to the upper mold partitioning wall.

* * * * *